United States Patent [19]

Kapteyn

[11] Patent Number: 5,627,637

[45] Date of Patent: May 6, 1997

[54] FULLY DISTRIBUTED OPTICAL FIBER STRAIN SENSOR

[76] Inventor: Kelvin L. Kapteyn, 1918 Axtell Rd., Apt. 1, Troy, Mich. 48084

[21] Appl. No.: 394,379

[22] Filed: Feb. 24, 1995

[51] Int. Cl.$^6$ .................................................. C01B 11/16
[52] U.S. Cl. ................................ 356/32; 73/800; 356/33
[58] Field of Search ........................... 356/32–35.5, 73.1, 356/364–370; 73/800, 862.624; 250/227.11, 227.14, 227.17, 231.1, 227.18

[56] References Cited

U.S. PATENT DOCUMENTS

| | | | |
|---|---|---|---|
| 4,595,284 | 6/1986 | Tatekura et al. | 356/73.1 |
| 4,997,277 | 3/1991 | Horiguchi et al. | 356/73.1 |

OTHER PUBLICATIONS

Kuzyk, G. et al., "Doped Polymers as Third-Order Nonlinear-Optical Materials," Mat Res. Soc. Symp. Proc. vol. 214, p. 3–1 (1991).

Handerek, V.A. et al., "Distributed Sensing Using Non-Linear Optical Effects in Polarisation Maintaining Optical Fibres," King's College London.

Rogers, A.J., "Distributed Optical-Fibre Sensors," J. Phys. D: Appl. Phys., 19, pp. 2237–2255 (1986).

Cokgor, I., et al., "Distributed optical–fiber sensors for spatial location of mode coupling by using the optical Kerr effect," Optics Letters, 18:9, pp. 705–707 (1993).

Parvaneh, F. et al., "Frequency-derived remote measurement of birefringence in polarization maintaining fiber by using the optical Kerr effect", Optics Letters, 17:19, pp. 1346–1348 (1992).

Cokgor, Ilkan et al., "Rapid mapping of transverse stresses along a highly–birefringent optical fibre," Department of Electronic and Electrical Engineering.

Parvaneh, F. et al., "Forward–Scatter Frequency–Derived Distributed Optical Fibre Sensing Using the Optical Kerr Effects". Apr. 1992.

Handerek, V.A. et al., "Sensor System Architectures for Spatially–Resolved Dynamic Strain Measurement Using Optical Fibres," First European Conference on Smart Structures and Materials May, 1992.

Rogers, A.J. et al., "Optical–fibre Sensor for the Distributed Measurement of Strain in Structures", King's College.

Parveneh, F., et al. "Frequency–Derived Distributed Optical Fibre Sensing," King's College London, Oct. 1992.

Kapteyn, Kelvin Lloyd, "Fully Distributed Fiber Optic Strain Sensor Based on the Kerr Nonlinear Optical Effects, the Photoelastic Effect and Counterpropagating Optical Pulses," Dissertation, Mar., 1995.

*Primary Examiner*—Hoa Q. Pham
*Attorney, Agent, or Firm*—Harness, Dickey & Pierce, P.L.C.

[57] ABSTRACT

A fully distributed optical fiber strain sensor that makes use of the nonlinear Kerr effect and the photoelastic effect. The sensor includes a polarization maintaining optical fiber having a core region and a cladding region where the fiber is embedded within or adhered to a structural element that is to be monitored for strain. Counterpropagating optical pulses interact within the fiber such that the change in refractive index caused by the Kerr effect causes a portion of the pulse intensities to be emitted from the fiber. A strain on the fiber will cause the index of refraction of the core region to change such that a different pulse intensity is emitted from the core region. This change in the loss of pulse intensity can be used to determine the amount of strain on the structure at the interaction region. By taking a strain measurement along two polarization directions and at two different wavelengths, the direction of the strain can also be determined.

17 Claims, 3 Drawing Sheets

FULLY DISTRIBUTED OPTICAL FIBER STRAIN SENSOR

BACKGROUND OF THE INVENTION

1. Field Of The Invention

This invention relates generally to a fully distributed optical fiber strain sensor and, more particularly, to a fully distributed optical fiber strain sensor including a polarization maintaining optical fiber where strain in the fiber is measured as a result of Kerr effect losses in the fiber and the photoelastic effect.

2. Discussion of the Related Art

Strain sensors are an important and useful tool for measuring and monitoring strain levels in certain structures in order to provide inspection and flaw detection of the structures. Examples of structures that could benefit from such inspection and flaw detection include airplane wings and body structures, bridges and buildings. It has been suggested that it would be desirable to use strain sensors to inspect building and bridge structures after being subjected to violent conditions, such as earthquakes. Other areas that could benefit from such inspection include structures where human inspection is difficult or impossible, such as on space stations.

One type of strain sensor that has proven effective are optical fiber strain sensors used to detect strain in a structure. Typically, in these types of sensors, an optical fiber is appropriately affixed to or fabricated within a structure that is to be inspected or monitored for defects. In this configuration, strain in the structure is transferred to the optical fiber. An optical beam from an applicable light source, such as a laser or photodiode, is introduced into an end of the optical fiber during the inspection. The behavior of the optical beam is then monitored within the optical fiber. If no strain is on the optical fiber, then a base or calibrated optical condition is determined. If, however, a strain is on the optical fiber, then the light will be effected such that a difference between the calibrated optical condition and a strained optical condition can be assessed to determine the strain on the fiber.

There are a number of approaches that use disturbances in an optical beam traveling through an optical fiber as a method of detecting strain in the fiber. The most common approaches use integrating methods. These types of optical fiber strain sensors measure changes in the total length of the fiber. An optical beam propagating down an optical fiber will take a certain amount of time to travel from one end of the fiber to the other. A change in the length of the fiber as a result of a strain on the fiber will cause the time of propagation of the optical beam to be changed accordingly. The resulting difference measurement is the integral or average of the strain over the total path length of the fiber. In a variation of this integrating method, a reference fiber and a sensing fiber are provide in which the reference fiber is protected from strain and other effects. An optical beam is sent down the sensing fiber and the reference fiber, and an optical output from these two fibers are combined in an interference pattern. The interference pattern changes when a strain is applied to the sensing fiber. This change in the interference pattern is used to measure the change in length of the sensing fiber, and thus the strain in the sensing fiber. Because of this averaging affect, these types of optical strain sensors tend to have a very low sensitivity to localized phenomenon such as strain concentrations due to cracks, defects, or other geometrical considerations. Further, these types of averaging sensing methods generally assume that the strain in the fiber is in the uniaxial direction of the optical fiber. However, this assumption can sometimes lead to inaccurate results because the strain can be from any direction.

Another approach based on an integrating method is a method that utilizes the intensity modulation of an optical beam in the fiber that occurs from changing "microbends" in the fiber. This approach is based on the assumption that an increased strain, particularly in the transverse direction of the fiber, will increase minute bends in the fiber, thus resulting in greater light loss from the fiber. An improvement on this approach includes intentionally forming a series of small bends in the fiber to separate the fiber into a plurality of short sensing portions. If the fiber is strained in such a way that the distance between the ends of a sensing portion of the fiber increases, the bends in the fiber will tend to be reduced by the stretching action. This reduction in bend radii will decrease the light emitted from the fiber. Conversely, if the distance between the ends of the sensing portion of the fiber decreases, the bends in the fiber will increase and the light emitted from the fiber will also increase. Although the microbend sensors provide a simple solution for many applications, this method provides only approximate information about the state of strain in the structure, and suffers from low repeatability between detections.

Another approach is to utilize what has been referred to as point sensors. Point sensors are essentially integrating optical fiber sensors where the optical fiber has been shortened to the point where the length of the fiber is on the order of an electrical resistance strain gage. In one type of optical fiber point sensor, one end of the fiber is mirrored and a partially mirrored surface is spliced into the fiber such that a distance between the mirrored end of the fiber and the partially mirrored surface is a sensing region. A reference component of an optical beam that is emitted into the fiber from an end opposite to the mirrored end is reflected from the partially mirrored surface and a sensing component of the optical beam is reflected off the mirrored end. The reference component and the sensing component are combined at a detector to form an interference pattern. Changes in interference pattern can be analyzed to determine strain in the sensing region. Other variations of generating an interference pattern for strain detection in this manner are also known. Although the point sensors are applicable in many instances, a large number of strain sensors are necessary to provide a point indication of strain in a particular structure.

Another type of optical strain sensor is a "quasi-distributed" strain sensor referred to as an Optical Time Domain Reflectometry (OTDR) sensor. What is meant by distributed strain sensor is a strain sensor that is capable of determining strain at any point along the sensing region of the fiber. An OTDR sensor is a sensor that introduces short pulses of light into one end of a sensing fiber, then analyzes the portion of the pulses that are reflected back from several strategically located prefabricated markers in the fiber. The prefabricated markers are generally made by cleaving the fiber, then reattaching the fiber in an imperfect manner. Reflection spikes from the marker points in the fiber are displayed on a screen to show the distance between the markers along the fiber. A change in the calibrated distance between the spikes represents a strain in the optical fiber at that location.

Although the OTDR sensors provide advantages over the integrating sensors, the OTDR sensors still suffer from a number of disadvantages. These disadvantages include a limitation on the number of marker points because of losses of the signal pulse energy and resolution of the system, the high cost of the precision equipment needed for the measurements, slow speed of measurements that result from the low energy signal and the large number of averages needed to gain the required precision, the result of prefabricating the markers before the sensor is installed in the structures, and the need for expert operator to read and interpret the spike signal data.

Advances in fiber optic strain sensors have led to sensors that provide fully distributed sensing. That is, the sensor can indicate strain at any location along a sensing portion of the fiber. Different fully distributed fiber optical sensors that use polarization maintaining (PM) fibers, and make use of the Kerr effect to determine strain are known. A polarization maintaining fiber is a fiber that will maintain the direction of polarization of an optical beam that is introduced into the fiber. The Kerr effect is a nonlinear optical dependence on the intensity of light that effects the refractive index of an optical material. The Kerr effect is a well understood phenomenon in optics, and will be discussed in more detail below with reference to the preferred embodiments.

One type of optical fiber strain sensor that utilizes PM fibers and the Kerr effect is referred to as frequency-derived backscatter, as disclosed in Rogers, A. J. et al, "Novel Methods for Distributed Optical Fibre Sensing", proceedings of the SPIE, September, 1991 (Boston). The frequency-derived backscatter method includes measuring the spacial distribution of birefringence in a highly birefringent fiber. Strong optical pulses are introduced into the PM fiber with equal energy for each of the polarization directions of the fiber. Ideally, the pulse length should be one half of the "beat length" of the PM fiber. A back-reflected signal from the opposite end of the fiber is monitored by a photodiode as a function of time for each polarization direction. As a result of the changing polarization state of the pulses as they travel down the fiber, there will be moderately high frequency modulation of the backscattered signal. By sampling simultaneously at two wavelengths, there is an additional higher frequency output signal that can be used to effectively separate the spatial changes in polarization.

Another approach similar to the frequency-derived backscatter appoach is referred to as forward-scatter frequency-derived distributed optical fiber sensing as disclosed in Parvaneh, F. et al, "Frequency-Derived Remote Measurement of Birefringence in Polarization-Maintaining Fiber by Using the optical Kerr Effect", Optics Letters, Vol. 17, No. 19, Oct. 1, 1992, pp. 1346–1348. This method uses strong optical pulses introduced into one end of a fiber at 45° relative to a polarization maintaining axis of the fiber. The polarization state of the pulses will then change cyclically through all states of polarization due to the different propagation characteristics in the major and minor directions of the PM fiber. If the pulse is of sufficient power to produce a significant Kerr effect, the Kerr induced change in index will have the effect of causing the polarization axis of the fiber to oscillate sinusoidally down the fiber. If a continuous optical signal is counterpropagated from an opposite end of the fiber and is aligned with one of the polarization axis of the fiber, when the continuous signal encounters the pulse travelling in the opposite direction, a portion of the energy will get cross-coupled into the other polarization direction as a result of the oscillating polarization axis. An emerging signal of the continuous signal will contain a spatially mapped pattern representing the axial polarization state of the fiber. Any change in the axial polarization state relative to the original, non-strained state can then be distinguished.

Another approach similar to the frequency-derived backscatter approach is referred to as optical Kerr effect frequency-derived backscatter using measure-and-induced coupling. This approach introduces an optical pulse along one of the polarization axis of a PM fiber, and introduces a continuous optical beam at 45° relative to the polarization axis. A variation of this approach includes introducing a continuous optical beam into the fiber at one end equally exciting both polarization axis of the fiber. A strong pulse of a different wavelength is introduced into the fiber from the other end, also equally exciting both polarization axis of the fiber. The result of this arrangement is a modulation of the pulse signal at a frequency that is a function of the birefringence of the fiber and a difference in wavelength between the pulse and the continuous beam. This modulation can be used to measure the birefringence distribution over the length of the fiber.

Although fully distributed optical fiber sensors provide significant advancements in determining strain in an optical fiber, these types of sensors still do not offer the type of anisotropic measurement that allows a determination of strain in all directions of the fiber.

What is needed is a fully distributed optical fiber strain sensor that allows fully distributed strain sensing, and provides a measurement of strain in all directions. It is therefore an object of the present invention to provide such a strain sensor.

SUMMARY OF THE INVENTION

In accordance with the teaching of the present invention, a fully distributed optical fiber strain sensor is disclosed that makes use of the nonlinear Kerr effect and the photoelastic effect. The sensor includes a polarization maintaining optical fiber having a core region and a cladding region where the fiber is embedded within or adhered to a structural element that is to be monitored for strain. Counterpropagating optical pulses are emitted into opposite ends of the fiber such that the pulses interact at an interaction region in the fiber. The counterpropagating pulses are timed so that the interaction region can be moved along the fiber so as to measure strain at any location in the structure. In one embodiment, the core region of the fiber is made of a nonlinear Kerr material such that the intensity of the pulses changes the index of refractive of the core region. The interaction of the pulses increases the total pulse intensity such that a portion of the pulse energy is emitted from the core region as a result of the change in the index of refraction. A strain on the fiber will cause the index of refraction of the core region to change such that the loss of pulse intensity will also change when the pulses interact. The change in the loss of pulse intensity can be used to determine the amount of the strain on the structure at the interaction region. By taking a strain measurement along two polarization directions and at two different wavelengths, the direction of the strain can be determined.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments concerning a fully distributed optical fiber strain sensor is merely exemplary in nature and is in no way intended to limit the invention or its application or uses.

In accordance with the teaching of the present invention, an optical fiber strain sensor is disclosed that is capable of providing measurements of strain on an optical fiber where information of the location, magnitude and direction of the strain can be ascertained. As will be discussed in greater detail below, the optical fiber associated with the strain sensor will be embedded within or adequately adhered to a structural element of a certain structure, such as an aircraft wing, building, bridge, etc., that is to be measured for cracks, or other defects that puts strain on the structural element. What is meant by strain in this context is any measurable change in the configuration of the structural element from a relaxed or calibrated condition. The following discussion of the preferred embodiments is based on a PhD thesis paper by Kelvin L. Kapteyn titled "Three Dimensional, Fully Distributed Fiber Optic Strain Sensor Based on the Kerr Nonlinear Optical Effect, the Photoelastic Effect, and Counter-propagating Optical Pulses", available from Michigan Technological University, Houghton, Mich., March, 1995, and herein incorporated by reference.

Figure 1:
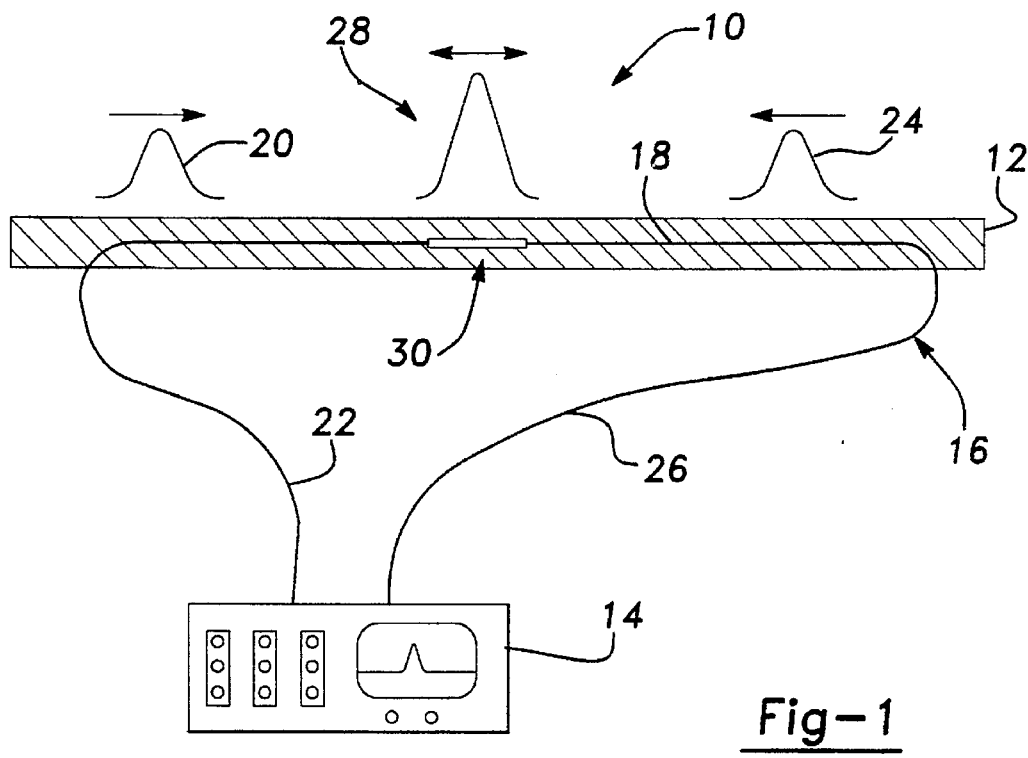
FIG. 1 is a diagrammatic view showing the interaction of counterpropagating pulses in an optical fiber associated with an optical fiber strain sensor according to an embodiment of the present invention.

A diagrammatic overview of a strain sensor system 10, according to an embodiment of the present invention, that measures strain in a structure 12 is shown in FIG. 1. The system 10 includes a monitoring unit 14 and an optical fiber 16. Both ends of the optical fiber 16 are optically connected to the unit 14 in a manner that would be well understood to one skilled in the art. A sensing portion 18 of the optical fiber 16 is embedded within the structure 12 at the time of the manufacture of the structure 12. The sensing portion 18 can also be attached to a surface of the structure 12 by an appropriate adhesive. Strains in the structure 12 will cause strains in the sensing portion 18 of the fiber 16 that can be measured by the unit 14. The monitoring unit 14 can be connected to and removed from the fiber 16 to measure the strain on the structure 12 at different times, and also to use the monitoring unit 14 for many different embedded optical fibers.

The monitoring unit 14 will introduce a first optical pulse 20 into one end 22 of the fiber 16, and will introduce a second optical pulse 24 into an opposite end 26 of the fiber 16. The pulses 20 and 24 will propagate through the fiber 16 towards each other. By timing the two optical pulses 20 and 24 appropriately, the pulses 20 and 24 will cross and interact to form a larger interaction pulse 28 at an interrogation region 30 within the sensing portion 18. The optical fiber 16 is designed in a manner, as will be discussed in detail below, such that a measurable power loss of light will occur from the interaction of the pulses 20 and 24. In other words, some of the light from both of the pulses 20 and 24 will be emitted from the core region (see FIG. 2) of the fiber 16 as a result of the intensity increase of the interaction pulse 28 and the material of the fiber 16. Loss of intensity of one or both of the pulses 20 and 24 is measured by the unit 14 after the interaction. This loss of intensity of the pulses 20 and 24 will be calibrated at a time when no strain is on the structure 12.

At a subsequent time, the loss of intensity will again be measured, and the difference of the new power loss will be compared to the original calibrated power loss to determine whether a strain is on the structure 12, and if so what direction and magnitude of strain. The operation of the sensor system 10 will consist of varying the relative input timing and frequency of the two pulses 20 and 24 to sweep the interaction pulse 28 down the sensing portion 18 of the fiber 16. This same operation will be repeated for different polarization directions and different pulse wave lengths to determine strain location, magnitude and direction in the structure 12. It is noted that it is within the scope of the present invention that a pulse be emitted into one end of the fiber 16 and a continuous beam be emitted into an opposite end of the fiber 16.

Figure 2:
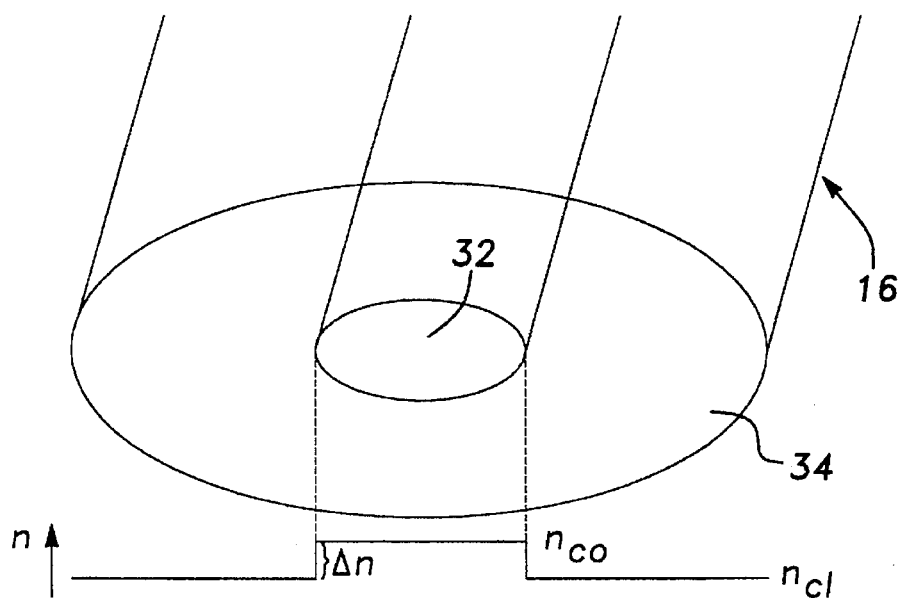
FIG. 2 is an end perspective view of an optical fiber according to an embodiment of the present invention.

FIG. 2 shows an end perspective view of the optical fiber 16 having a core region 32 and a cladding region 34. The refractive index $n_{co}$ of the core region 32 is slightly greater than the refractive index $n_{cl}$ of the cladding region 34. The difference between the refractive index $n_{co}$ and the refractive index $n_{cl}$ is $\Delta n$ and will be relatively small. The larger refractive index $n_{co}$ in the core region 32 relative to the cladding region 34 causes light to be trapped within the core region 32. For reasons that will become apparent from the discussion below, the cross-section of both the core region 32 and the cladding region 34 have an elliptical configuration.

Typical optical-fibers used for communication purposes have circular cross-sections and are based on the principle of total internal reflection so as to reduce to the extent possible light loss out of the fiber 16. That is, an optical beam emitted at the appropriate angle (at or below the critical angle) into the core region 32 will be reflected off the boundary between the core region 32 and the cladding region 34 because the refractive index $n_{co}$ of the core region 32 is slightly greater than the refractive index $n_{cl}$ of the cladding region 34. Because of this change in refractive index, only light rays that are emitted into the core region 32 substantially parallel to the fiber 16 will be reflected and remain guided within the fiber 16. Generally, for typical communications optical fibers, the core region 32 and the cladding region 34 are made of the same material, but the core region 32 is doped with an appropriate material to increase its refractive index.

For the strain sensor system 10 of the preferred embodiments, some mechanism must be used to determine the strain in the fiber 16. That mechanism is the photoelastic effect. The photoelastic effect is the change in refractive index of an optical material when it is subjected to a strain field. As is well understood in the art, a strain field will induce an anisotropic refractive index oriented in the direction of the principle stresses in the material. Therefore, the amount of energy that is lost from the fiber 16 from the interaction pulse 28 will vary when a strain is applied to the fiber 16. In a preferred embodiment of the present invention, the material of the core region 32 and the cladding region 34 of the fiber 16 will be different. This is because a measure of the strain on the fiber 16 will be more apparent if the photoelastic response of the core region 32 and the cladding region 34 of the fiber 16 to a particular strain is different. As a result of this differing response to strain, the step in the refractive index $\Delta n$ between the core region 32 and the cladding region 34 will change in direct relation to the applied strain.

Most optical fibers for communication purposes are linear optical fibers in that the properties of the fiber do not significantly depend on the amplitude of the electrical field components of the light propagating in the fiber. However, an interaction between the pulses 20 and 24 would not result in a loss of intensity in a linear fiber. Therefore, it is desirable that the core region 32 of the optical fiber 16 of the invention be a nonlinear material where the properties of the fiber 16 will depend on the amplitude of the electric field E of the light propagating through the fiber 16. Without this dependence on the amplitude of the electric field E, there is no mechanism that will cause an energy loss from an interaction between the counterpropagating pulses 20 and 24. The linearity or nonlinearity of the optical fiber 16 depends on the material that forms the core region 32. The type of material that makes up the core region 32 and the cladding region 34 will be discussed below.

Having established that some form of nonlinear effect in the fiber 16 must be present to measure a change in the refractive index of the fiber 16, a way to measure this nonlinear effect is needed. Different optical effects are known in the art that can be used to determine the nonlinear effect of a nonlinear fiber. These effects include second and third order nonlinear optical effects, as well as other optical effects as discussed in the thesis paper referenced above. The Kerr effect describes the effect of nonlinearity in the fiber 16. The Kerr effect refers to the effect where the refractive index of an optical material varies directly with the intensity of light in the material. Different mechanisms contribute to the Kerr effect in nonlinear optical materials. These different effects are well understood to those skilled in the art, and a more detailed discussion of these effects can be found in the thesis paper referenced above. The equation which describes the Kerr effect is given by:

$$n = n_0 + n_2 |E|^2 \quad (1)$$

where, n is the refractive index of the material under the effects of an intense optical beam;

$n_0$ is the refractive index of the material under no optical beam;

$n_2$ is the change in refractive index of the material from the optical beam; and E is the electric field in the optical material generated by the optical beam.

Figure 3A:
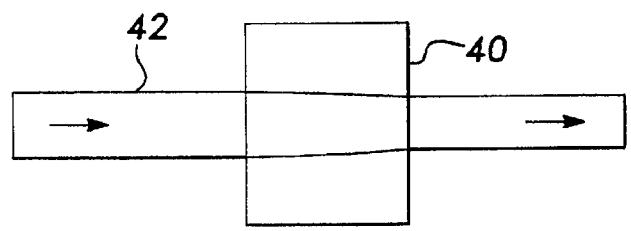
FIG. 3(a) and 3(b) show the effects of a positive and negative, respectfully, Kerr effect material on an optical beam.

If the refractive index $n_2$ is positive, the optical material is said to be "self-focusing" and if the refractive index $n_2$ is negative, the optical material is said to be "self-defocusing". FIG. 3(a) shows an illustration of an optical element 40 having a refractive index $n_0$ that is self-focusing. An intense optical beam 42 impinges the element 40 such that the optical beam 42 changes the refractive index n of the optical element 40 by equation (1) where the change in refractive index has the effect of focussing the light beam 42, as shown. Since the refractive index $n_2$ of the element 40 is positive the refractive index at the center of the optical beam 42 will be slightly higher than the refractive index at the edge of the beam 42. This variation in refractive index across the beam 42 will cause it to focus in on itself.

Figure 3B:
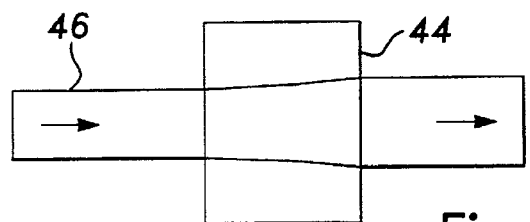

FIG. 3(b) shows an illustration of an optical element 44 having a refractive index $n_0$ that is self-defocusing. An intense optical beam 46 impinges the element 44 such that the optical beam 46 changes the refractive index n of the optical element 44 by equation (1) where the change in refractive index has the effect of defocusing or diverging the light beam 46, as shown. Since the refractive index $n_2$ of the element 44 is negative, the refractive index in the center of the optical beam 46 will be slightly less than the refractive index at the edge of the beam 46. This variation in refractive index across the beam 46 will cause it to diverge. In a preferred embodiment, self-defocusing optical materials are selected for the core region 32 of the fiber 16 because self-defocusing materials will enhance the desired power loss by "defocusing" light out of the core region 32 of the fiber 16.

As discussed above, it is desirable that the core region 32 be made of a nonlinear optical material. In a preferred embodiment, the core region 32 is made of a nonlinear optical material and the cladding region 34 is made of a linear optical material. It is noted, however, that fiber designs in which the cladding region 34 is nonlinear and the core region 32 is linear, both the core and cladding regions 32 and 34 are nonlinear with different sign or magnitude of nonlinearity, or both a nonlinear core and cladding regions 32 and 34 of the same magnitude of nonlinearity are possible alternatives without departing from the scope of the invention. Further, it is believed that a positive Kerr material will also work for the core region 32.

In a preferred embodiment, the optical fiber 16 is a polarization maintaining (PM) optical fiber. A PM optical fiber is a fiber that is designed to control the polarization of the light as it propagates through the fiber. For example, if an optical beam is introduced into the core region 32 of the optical fiber 16 having a particular orientation of its electric field, the optical beam that is emitted from an opposite end of the fiber 16 will have its electric field oriented in substantially the same direction. The requirement for a PM fiber is necessary because the magnitude of the Kerr nonlinearity depends on the polarization direction. The magnitude of the Kerr nonlinearity of the two counterpropagating pulses 20 and 24 if the electric fields of the two pulses 20 and 24 are aligned is approximately three times the magnitude if the electric field of the two pulses 20 and 24 are at 90° to each other.

Different ways are known in the art for providing a PM optical fiber. The most common method is a process of inducing a high level of stress into the fiber 16. An applied stress field will result in a birefringence in the material of the optical fiber 16. A birefringence of the optical material will cause the material to display two different indices of refraction in perpendicular directions. Another well known PM optical fiber design includes utilizing an elliptical core as is the core region 32 above. The guided propagation modes of an optical beam introduced into the core region 32 ill halve different propagation characteristics in the direction of the major and minor axes of the ellipse. Light that is introduced into the fiber 16 that is polarized along one of the geometric axis of the elliptical core 32 will tend to stay oriented along that axis.

Elliptical fibers have low internal stresses, and are less sensitive to temperature variations than the stress induced birefringent PM fibers. Also, the elliptical fiber approach is believed to be more effective for the purposes described herein because the high stress levels in the stress induced birefringent PM fibers may interfere with the strain that is being measured. Although the elliptical fiber design is preferred, it is noted that the induced birefringent PM fibers may be applicable, as well as other known approaches that provide PM fibers.

Having determined that power loss in the fiber 16 can be used to measure strain in the structure 12, it will now be shown how the power loss indicates what the level of strain is. An induced current representation of fiber nonlinearity is used to depict the power loss. The induced current representation comes directly from Maxwells' equations and would be known to one skilled in the art. The relevant equation (written in a form convenient for optical materials) is:

$$\nabla \times H = -i \left( \frac{\epsilon_o}{\mu_o} \right)^{1/2} kn^2 E \quad (2)$$

where, k=2π/λ is the wave number;

H is the electric field;

$\epsilon_0$ is the permittivity of free space; and $\mu_0$ is the permeability of free space.

After adding and subtracting the term $i((\epsilon_0/\mu_0)^{1/2}k\bar{n}^{-2}E$ from the right side of equation (2), where the $\bar{n}^{-2}$ term refers to the refractive index in an equivalent but uniform fiber, we get:

$$\nabla \times H = -i \left( \frac{\epsilon_o}{\mu_o} \right)^{1/2} k(\bar{n}^2 - n^2)E - i \left( \frac{\epsilon_o}{\mu_o} \right)^{1/2} k\bar{n}^2 E \quad (3)$$

where both n and $\bar{n}$ are functions of x and y. The first term on the right can be considered to be a nonphysical induced current, J defined by:

$$J = i \left( \frac{\epsilon_o}{\mu_o} \right)^{1/2} k(n^2 - \bar{n}^2)E_t \quad (4)$$

J is considered to be an induced current density that is set up by any variation in the refractive index in the optical fiber 16. J is not an actual current, but mathematically can be treated as such to aid in solving the equations.

At this point, the expression is still exact, provided the electric field is known exactly. To the lowest order, the fields in a weakly guiding fiber can be approximated by the field in an unperturbed weakly guiding fiber. These fields are assumed to be transverse and are represented by $\bar{E}_t$, where the bar indicates the fields in a uniform fiber, and the subscript "t" denotes a transverse field defined by:

$$J = i \left( \frac{\epsilon_o}{\mu_o} \right)^{1/2} k(\bar{n}^2 - n^2)E \quad (5)$$

The nonlinear refractive index is represented by equation (1), where $n_0$ is the "low intensity" or constant index, and $n_2$ is the nonlinear index. The $|E|^2$ term is the magnitude of the total electric field at the point under consideration, and is in general time dependant. If the source of the nonlinearity is electronic, the response of the material will be very fast relative to the time scale of optical pulses under consideration, so it is assumed that the response is instantaneous.

In the case at hand, the low intensity index $n_0$ is equal to the uniform index $\bar{n}$, and the electric fields $\bar{E}$ is represented by $\bar{E}_t^t$, where the superscript "t" refers to the total field that includes fields of a counterpropagating mode. Substituting equation (1) into equation (5) yields:

$$J = i \left( \frac{\epsilon_o}{\mu_o} \right)^{1/2} k[\bar{n}^2 - (\bar{n} + n_2|\bar{E}_t^t|^2)^2]\bar{E}_t =$$

$$i \left( \frac{\epsilon_o}{\mu_o} \right)^{1/2} k[\bar{n}^2 - (\bar{n}^2 + 2\bar{n}n_2|\bar{E}_t^t|^2 + n_2^2|\bar{E}_t^t|^4)]\bar{E}_t =$$

$$-i \left( \frac{\epsilon_o}{\mu_o} \right)^{1/2} k(2\bar{n}n_2|\bar{E}_t^t|^4)\bar{E}_t \quad (6)$$

Equation (6) holds as long as the electric field $\bar{E}_t^t$ refers to the total electric field and $\bar{E}_t$ is the field in the mode that is being reviewed.

In a circularly symmetric geometry such as with round optical fibers, a cylindrical polar coordinate system is used.

The normalized core radius is defined as R=r/ρ, where ρ is the core radius. A normalization factor, $N_0$ is defined by:

$$N_0 = \pi \rho^2 n_{co} \left( \frac{\epsilon_o}{\mu_o} \right)^{1/2} \int_0^\infty F_0^2(R) R dR \quad (7)$$

where $F_0$ (R) is the fundamental solution to a linear weakly guiding equation defined by:

$$\frac{d^2}{d} R^2 \psi_m(R) + \quad (8)$$

$$\frac{1}{R} \frac{d}{d} R\psi_m(R) + \left( U^2 - V^2 g(R) - \frac{m^2}{R^2} \right) \psi_m(R) = 0$$

$$g(R) = \frac{[n_{co}^2 - n^2(R)]}{[n_{co}^2 - n_{cl}^2]}$$

Equation (8) can be reduced to:

$$\left\{ \frac{d^2}{dr^2} + \frac{1}{r} \frac{d}{dr} + k^2 n^2(R) - \beta^2 \right\} F_o = 0 \quad (9)$$

where β is the propagation constant. The power that is initially in a constant amplitude fundamental mode before reaching any nonlinear interaction regions is then given by:

$$P_{\pm 0,0} = a_{\pm 0,0}^2 N_0 \quad (10)$$

where ±0 refers to the forward "+" or backward "−" propagating fundamental mode. Equation (10) can also describe the power as a function of z as long as the amplitude $a_{\pm 0,0}$ is a slowly varying function of z.

Although the induced current given by Equation (6) is not a physical current, it has the form of a current in the equations, and it represents power that is coupled out of a given mode. In general, the equation for time averaged power is given by:

$$P = -\frac{1}{2} \int_V (J \cdot E^*) dv \quad (11)$$

where v is the volume occupied by the currents, and E* is the complex conjugate of E. As before, E will be represented by $\bar{E}_t$. The expression for J from equation (6) is substituted into equation (11). The magnitude is taken because the phase of the radiated power is unimportant to this model such that:

$$P_J = \quad (12)$$

$$\left| -\frac{1}{2} \int_V \left( \left( -i \left( \frac{\epsilon_o}{\mu_o} \right)^{1/2} k(2\bar{n}n_2|\bar{E}_t^t|^2 + n_2^2|\bar{E}_t^t|^4)\bar{E}_t \right) \cdot \bar{E}_t^* \right) dv \right|$$

where $P_J$ is the amount of power represented by the induced current. The ratio of initial power lost from the forward and backward propagating modes to the induced current is given as:

$$\alpha_{1\pm 0} \equiv \frac{P_J}{P_{\pm 0,0}} \quad (13)$$

If there were a field of currents as described by equation (6), some of the power radiated by those currents would be radiated in the radiation modes of the fiber 16, and some would be coupled into the guided modes. The amount of power that goes into the fundamental guided mode from an x directed current, $J_x$ is given by:

$$P_{\pm 0,J} = \frac{1}{16\pi\rho^2 n_{co}} \left(\frac{\mu_o}{\epsilon_o}\right)^{1/2} \frac{\left|\int_V J_x F_0(R)\exp(\mp i\beta z)dv\right|^2}{\int_0^\infty R F_0^2(R)dR} \quad (14)$$

where,

β is the propagation constant;
R is the normalized core radius; and
$F_0(R)$ is the fundamental solution to the weakly guiding equation.

If equation (14) is compared with the general expression for the normalization given by equation (7), it can be shown that equation (14) reduces to:

$$P_{\pm 0,J} = \frac{1}{16 N_o} \left|\int_V J_x F_0(R)\exp(\mp i\beta z)dv\right|^2 \quad (15)$$

The ratio of induced current power that is coupled back into the guided modes is $P_{\pm 0,J}/P_J$. The ratio of induced current power that is radiated is given by:

$$\alpha_{2,\pm 0} \equiv 1 - \frac{P_{\pm 0,J}}{P_J} \quad (16)$$

Since the ratio of radiated induced current power to induced current power is $\alpha_{2,\pm 0}$, the ratio of guided power that is radiated is given by:

$$\gamma_{1,\pm 0} = \frac{\text{(induced current power)}}{\text{(initial guided power)}} \times \frac{\text{(radiated power)}}{\text{(induced current power)}} = \frac{\text{(radiated power)}}{\text{(initial guided power)}} \quad (17)$$

$$\therefore \gamma_{1,\pm 0} \equiv \alpha_{1,\pm 0}\alpha_{2,\pm 0}$$

The total radiated power is then $P_{rad} = \gamma_{1,\pm 0} P_{0,\pm 0}$. The ratio of guided power remaining after the nonlinear region will then be:

$$\gamma_{2,\pm 0} \equiv 1 - \gamma_{1,\pm 0} = \frac{\text{(remaining guided power)}}{\text{(initial guided power)}} \quad (18)$$

The electric field $\bar{E}_t$ is represented by:

$$\bar{E}_{t,\pm 0} = \alpha_{\pm 0}(z) F_0(R) \exp(\pm i\beta z) \quad (19)$$

where the amplitude $\alpha_{\pm 0}$ is an unknown function of z, and, $$F_0(R) = \begin{cases} J_0(UR)/J_0(U), & (R \leq 1) \\ K_0(WR)/K_0(W), & (R > 1) \end{cases} \quad (20)$$

where U and W are the core and cladding parameters defined as:

$$U = \rho(k^2 n_{co}^2 - \beta^2)^{1/2}$$
$$W = \rho(\beta^2 - k^2 n_{co}^2)^{1/2} \quad (21)$$
$$V = (U^2 + W^2)^{1/2}$$

The $|\bar{E}_t'|^2$ term can be expanded as follows:

$$|\bar{E}_t'|^2 \bar{E}_t' \cdot \bar{E}_t'^* \quad (22)$$

and, $$\bar{E}_t' = \bar{E}_{t,+0} + \bar{E}_{t,-0} = a_{+0} F_0(R) \exp(i\beta z) + a_{-0} F_0(R) \exp(-i\beta z) \quad (23)$$

Combining equations (22) and (23) yields:

$$|\bar{E}_t'|^2 F_0^2(R)[a_{+0}^2 + a_{-0}^2 + 2a_{+0}a_{-0}\cos(2\beta z)] \quad (24)$$

Equation (24) is then squared to get the $|\bar{E}_t'|^4$ term:

$$\begin{aligned}|\bar{E}_t'|^4 &= F_0^4(R)[a_{+0}^4 + a_{-0}^4 + 2a_{+0}^2 a_{-0}^2 + 4a_{+0}^3 a_{-0}\cos(2\beta z) + \\ &\quad 4a_{+0}a_{-0}^3\cos(2\beta z) + 4a_{+0}^2 a_{-0}^2\cos^2(2\beta z)] \\ &= F_0^4(R)[a_{+0}^4 + a_{-0}^4 + 4a_{+0}^2 a_{-0}^2 + 4a_{+0}^3 a_{-0}\cos(2\beta z) + \\ &\quad 4a_{+0}a_{-0}^3\cos(2\beta z) + 2a_{+0}^2 a_{-0}^2\cos(4\beta z)]\end{aligned} \quad (25)$$

The fields are being modeled as the fields for a step index weakly guiding fiber, but the fiber 16 will not be a step index due to the nonlinearity. As a result, the fields will shift somewhat from the weakly guiding solution, $F_0(R)$ to a new $F(R)$ that will take the nonlinearity into account. The change from $F_0(R)$ to $F(R)$ will be small.

Combining equations (19), (23), (24) and (12) yields:

$$P_J = \left|\frac{i}{2}\left(\frac{\epsilon_o}{\mu_o}\right)^{1/2} k \frac{\int}{v} [2\bar{n}n_2 F_0^2(R)[a_{-0}^2 + 2a_{+0}a_{-0}\cos(2\beta z)] + \right. \\ \left. n_2^2 F_0^4(R)[a_{-0}^4 + 4a_{+0}^2 a_{-0}^2 + 4(a_{+0}^3 a_{-0} + a_{+0}a_{-0}^3)\cos(\beta z) + \right. \\ \left. 2a_{+0}^2 a_{-0}^2 \cos(4\beta z)]] \cdot [a_{+0}^2 F_0^2(R)]dv\right| \quad (26)$$

Under the assumption of quasi-constant amplitudes, the $\cos(2\beta z)$ and $\cos(4\beta z)$ terms in equation (26) will be negligible since they represent periodic amplitude changes in the "z" direction and will tend to integrate to nearly zero as given by:

$$\begin{aligned}P_J &= \left|\frac{i}{2}\left(\frac{\epsilon_o}{\mu_o}\right)^{1/2} k \frac{\int}{v} [2\bar{n}n_2 F_0^2(R) a_{-0}^2 + n_2^2 F_0^4(R)(a_{-0}^4 + 4a_{+0}^2 a_{-0}^2)] [a_0^2 F_0^2(R)]dv\right| \\ &= \left(\frac{\epsilon_o}{\mu_o}\right)^{1/2} \frac{k}{2}\left|\int_v [2\bar{n}n_2 F_0^4(R)(a_{+0}^2 a_{-0}^2) + n_2^2 F_0^6(R)(a_{+0}^2 a_{-0}^4 + 4a_{+0}^4 a_{-0}^2)]dv\right|\end{aligned} \quad (27)$$

The radial part of the integrals is represented by:

$$I_1 = \int_R 2\bar{n}n_2 F_0^4(UR) R dR \quad (28)$$

$$I_2 = \int_R n_2^2 F_0^6(UR) R dR$$

and the z dependent portion of the integrals is represented by:

$$I_3 = \int_{z1}^{z2} [a_{+0}^2 a_{-0}^2 + 2a_{+0}^3 a_{-0}\cos(2\beta z)]dz \equiv \int_{z1}^{z2} (a_{+0}^2 a_{-0}^2)dz \tag{29}$$

$$I_4 = \int_{z1}^{z2} [a_{+0}^2 a_{-0}^4 + 4a_{+0}^4 a_{-0}^2 + 4(a_{+0}^5 a_{-0} + a_{+0}^3 a_{-0}^3)\cos(2\beta z) +$$

$$2a_{+0}^4 a_{-0}^2 \cos(4\beta z)]dz \equiv \int_{z1}^{z2} (a_{+0}^2 a_{-0}^4 + 4a_{+0}^4 + 4a_{-0}^2)dz$$

Equation (27) then reduces to:

$$P_J = \left(\frac{\epsilon_o}{\mu_o}\right)^{1/2} k\pi\rho^2 |[I_1 I_3 + I_2 I_4]| \tag{30}$$

The part of the induced current power that is coupled back into the fundamental mode is given by equation (15). Substituting in the expressions for the electric fields gives:

$$P_{\pm 0,J} = \frac{1}{16N_0} \left| -i\left(\frac{\epsilon_o}{\mu_o}\right)^{1/2} k \int_\upsilon [2\bar{n}n_2 F_0^2(R)(a_{-0}^2 + \tag{31}$$

$$2a_{+0}a_{-0}\cos(2\beta z)) + n_2^2 F_0^4(R)(a_{-0}^4 + 4a_{+0}^2 a_{-0}^2 +$$

$$4(a_{+0}^3 a_{-0} + a_{+0} a_{-0}^3)\cos(2\beta z) +$$

$$2a_{+0}^2 a_{-0}^2 \cos(4\beta z))] a_{+0} F_0^2(R) \exp((1 \mp 1)i\beta z)d\upsilon \bigg|^2$$

where the "$\mp$" corresponds to the "$\pm$" subscript on P. The power coupled back into the forward propagating mode is then given by:

$$P_{+0,J} = \frac{k^2}{16N_0}\left(\frac{\epsilon_o}{\mu_o}\right) \left| \int_\upsilon [2\bar{n}n_2 F_0^2(R)(a_{-0}^2 + \tag{32}$$

$$2a_{+0}a_{-0}\cos(2\beta z)) + n_2^2 F_0^4(F)(a_{-0}^4 +$$

$$4a_{+0}^2 a_{-0}^2 + 4(a_{+0}^3 a_{-0} + a_{+0} a_{-0}^3)\cos(2\beta z) +$$

$$2a_{+0}^2 a_{-0}^2 \cos(4\beta z))] a_{+0} F_0^2(R)d\upsilon \bigg|^2$$

$$= \frac{k^2\pi^2\rho^4}{4N_0}\left(\frac{\epsilon_o}{\mu_o}\right) |[I_1 I_5 + I_2 I_6]|^2$$

where $I_5$ and $I_6$ are defined by:

$$I_5 = \int_{z1}^{z2} [a_{+0} a_{-0}^2 + 2a_{+0}^2 a_{-0}\cos(2\beta z)]dz \equiv \int_{z1}^{z2} (a_{+0} a_{-0}^2)dz \tag{33}$$

$$I_6 = \int_{z1}^{z2} [a_{+0} a_{-0}^4 + 4a_{+0}^3 a_{-0}^2 +$$

$$4(a_{+0}^4 a_{-0} + a_{-0} + a_{+0}^2 a_{-0}^3)\cos(2\beta z) +$$

$$2a_{+0}^3 a_{-0}^2 \cos(4\beta z)]dz \equiv \int_{z1}^{z2} (a_{+0} a_{-0}^4 + 4a_{+0}^3 a_{-0}^2)dz$$

The power coupled into the backward propagating mode is given by:

$$P_{-0,J} = \frac{k^2}{16N_0}\left(\frac{\epsilon_o}{\mu_o}\right) \left| \int_\upsilon [2\bar{n}n_2 F_0^2(R)(a_{-0}^2 + \tag{34}$$

$$2a_{+0}a_{-0}\cos(2\beta z)) + n_2^2 F_0^4(R)(a_{-0}^4 + 4a_{+0}^2 a_{-0}^2 +$$

$$4(a_{+0}^3 a_{-0} + a_{+0} a_{-0}^3)\cos(2\beta z) +$$

$$2a_{+0}^2 a_{-0}^2 \cos(4\beta z))] a_{+0} F_0^2(R) \exp(2i\beta z)d\upsilon \bigg|^2$$

At present, attention is focused on the forward propagating mode. As a result of symmetry arguments, the amount of energy transferred from the backward propagating mode to the forward one is also represented by equation (34), but with the subscripts reversed as:

$$P_{+0,J} = \frac{k^2}{16N_0}\left(\frac{\epsilon_o}{\mu_o}\right) \left| \int_\upsilon [2\bar{n}n_2 F_0^4(R)(a_{+0}^2 a_{-0} + \tag{35}$$

$$2a_{+0}a_{-0}^2\cos(2\beta z)) + n_2^2 F_0^6(R)(a_{+0}^4 a_{-0} +$$

$$4a_{+0}^2 a_{-0}^2 + 4(a_{+0}^4 a_{-0} + a_{+0}^2 a_{-0}^2 \cos(2\beta z) +$$

$$2a_{+0}^2 a_{-0}^2 \cos(4\beta z))]\exp(2i\beta z)d\upsilon \bigg|^2$$

$$= \frac{k^2\pi^2\rho^4}{4N_0}\left(\frac{\epsilon_o}{\mu_o}\right) |[I_1 I_7 + I_2 I_8]|^2$$

where the subscript "+" denotes the power transferred from the backward propagating mode to the forward propagating mode and $I_7$ and $I_8$ are defined by:

$$I_7 = \int_{z1}^{z2} [(a_{+0}^2 a_{-0} + 2a_{+0} a_{-0}^2 \cos(2\beta z))]\exp(2i\beta z)dz \equiv \tag{36}$$

$$\int_{z1}^{z2} (a_{+0} a_{-0}^2)dz$$

$$I_8 = \int_{z1}^{z2} [a_{+0}^4 a_{-0} + 4a_{+0}^2 a_{-0}^3 +$$

$$4(a_{+0} a_{-0}^4 + a_{+0}^3 + a_{-0}^2)\cos(2\beta z) +$$

$$2a_{+0}^3 a_{-0}^2 \cos(4\beta z)]\exp(2i\beta z)dz \equiv$$

$$2\int_{z1}^{z2} (a_{+0} a_{-0}^4 + a_{+0}^3 a_{-0}^3) dz$$

The total amount of power "re-coupled" into the forward propagating mode from the induced current is therefore given by (combining equations (32) and (35)):

$$P_{\pm 0,J} = \frac{k^2\pi^2\rho^2}{4N_0}\left(\frac{\epsilon_o}{mu 6_o}\right) [|[I_1 I_5 + I_2 I_6]|^2 + |[I_1 I_7 + I_2 I_8]dz|^2] \tag{37}$$

What remains is to compute the integrals in equations (28), (29), (33) and (36) for the fiber geometry and modal amplitudes of interest, then compute the appropriate power ratios. When doing this, the polarization should be carefully taken into account. In this derivation, the polarization of the forward and backward modes are assumed to coincide as would happen if they were launched on the same axis of a polarization maintaining fiber.

The application of a strain on the fiber 16 will result in a change in the step in refractive index between the core region 32 and cladding region 34. This step in index is referred to as Δn. The change in Δn is due to the different behavior of the core and cladding materials. When a strain is applied to the fiber 16, the strain field will be essentially constant throughout the cross-section of the fiber 16. The strain will cause a change in the refractive index of the core region 32 and the cladding region 34. Due to the different strain optic response of the two materials, the core and cladding refractive indices will change by different amounts, which will result in a change in Δn.

Now consider the special case of the principal directions coinciding with the x, y and z directions. Consider a wave propagating in the z direction with the electric vector in the x direction, and the subscripts co and cl representing the core and cladding regions 32 and 34, respectively, given as:

$$n_{x,co}=n_{co}[1-\tfrac{1}{2}n_{co}^2(P_{11,co}e_x+P_{12,co}(e_y+e_z))]$$

$$n_{x,cl}=n_{cl}[1-\tfrac{1}{2}n_{cl}^2(P_{11,cl}e_x+P_{12,cl}(e_y+e_z)]\text{tm} \quad (38)$$

If, in equation (38) the strains in the core region 32 and the cladding region 34 are assumed to be the same, then $\Delta n$ becomes:

$$\begin{aligned}
\Delta n &= n_{x,co} - n_{x,cl} \quad (39)\\
&= n_{co}\left[1-\tfrac{1}{2}n_{co}^2(P_{11,co}e_x+P_{12,co}(e_y+e_z))\right] - \\
&\quad n_{cl}\left[1-\tfrac{1}{2}n_{cl}^2(P_{11,cl}e_x+P_{12,cl}(e_y+e_z))\right]\\
&= (n_{co}-n_{cl})-\tfrac{1}{2}n_{co}^3[P_{11,co}e_x+\\
&\quad P_{12,co}(e_y+e_z)]+n_{cl}^3(P_{11,cl}e_x+P_{12,cl}(e_y+e_z))\\
&= \Delta n_0-\tfrac{1}{2}[(n_{co}^3P_{11,co}-n_{cl}^3)P_{11,cl})e_x+\\
&\quad (n_{co}^3P_{12,co}-n_{cl}^3P_{12,cl})(e_y+e_z)]
\end{aligned}$$

The difficulty with equation (39) is that the principal directions will not generally coincide with the fiber coordinate directions. As a result, a more general derivation that includes all of the principal strains in a random direction is needed. This can be accomplished by starting with the realization that the principal strain directions coincide with the principal refractive index directions. The principal refractive index directions can be directly modelled as:

$$n_{p1}=n_o(1-\tfrac{1}{2}n_o^2(P_{11}e_{p1}+P_{12}(e_{p2}+e_{p3})))$$

$$n_{p2}=n_o(1-\tfrac{1}{2}n_o^2(P_{11}3_{p2}+P_{12}(e_{p1}+e_{p3})))\text{tm} \quad (40)$$

$$n_{p3}=n_o(1-\tfrac{1}{2}n_o^2(P_{11}e_{p3}+P_{12}(e_{p1}+3_{p2})))$$

In matrix form, these can be represented as:

$$[\rightarrow n_p] = \begin{bmatrix} n_{p1} & 0 & 0 \\ 0 & n_{p2} & 0 \\ 0 & 0 & n_{p3} \end{bmatrix} \quad (41)$$

The refractive index vector, $\bar{n}$ representing the magnitude and direction of the refractive index on any arbitrary plane with outward normal unit vector $\hat{n}_s=l\hat{i}'+m\hat{j}'+n\hat{k}'$, where $\hat{i}'$, $\hat{j}'$, and $\hat{k}'$ are the principal directions, and l, m, and n are the direction cosines is:

$$\bar{n}=\rightarrow n_p\cdot\overline{n_s} = \begin{bmatrix} n_{p1} & 0 & 0 \\ 0 & n_{p1} & 0 \\ 0 & 0 & n_{p3} \end{bmatrix}\begin{bmatrix} l \\ m \\ n \end{bmatrix} = n_{p1}l\hat{i}+n_{p2}m\hat{j}+n_{p3}n\hat{k} \quad (42)$$

The refractive index in the normal, or $\hat{n}_s$ direction is then:

$$n_{nn}=\bar{n}\cdot\hat{n}_s=n_{p1}l^2+n_{p2}m^2+n_{p3}n^2 \quad (43)$$

Where $n_{nn}$ refers to the normal component of the refractive index in the direction of the subscript n. Thus far, the direction of $\hat{n}_s$ is arbitrary. The direction can then be specified for convenience. First, the x direction is chosen as the normal direction. In this case, $\hat{n}_s=\hat{x}$. The subscript x is then used to denote the $\hat{x}$ direction:

$$n_{xx}=n_{p1}l_x^2+n_{p2}m_x^2+n_{p3}n_x^2 \quad (44)$$

where the $l_x$, $m_x$, and $n_x$ are direction cosines from the principal coordinate system to the $\hat{x}$ direction. The same derivation holds for the $\hat{y}$ direction to get:

$$n_{yy}=n_{p1}l_y^2+n_{p2}m_y^2+n_{p3}n_y^2 \quad (45)$$

The crossed index terms, $n_{xy}$, $n_{xz}$, and $n_{yz}$ are assumed to be negligible due to the polarization maintaining properties of the elliptical core fibers being used. This is because the main effect of the cross index terms is to transfer some energy between the orthogonal modes in the fiber. The polarization maintaining fiber used will minimize this energy transfer. This assumption will not hold if the perturbation of the fiber 16 is periodic and phase matched with respect to the beat length of the fiber 16.

Now, equations are written separately for the core and cladding regions 32 and 34. It is again assumed that the strain will be constant between the core and cladding regions 32 and 34, but the material properties will. be different. It is important to note that the strain-optic properties are not the same in the core and cladding regions 32 and 34. We then get:

$$n_{p1,co}=n_{co}(1-\tfrac{1}{2}n_{co}^2(P_{11,co}e_{p1}+P_{12,co}(e_{p2}+e_{p3})))$$

$$n_{p1,cl}=n_{cl}(1-\tfrac{1}{2}n_{cl}^2(P_{11,cl}e_{p1}+P_{12,cl}(3_{p2}+3_{p3})))$$

$$n_{p2,co}=n_{co}(1-\tfrac{1}{2}n_{co}^2(P_{11,cp}e_{p2}+P_{12,co}(e_{p1}+e_{p3})))$$

$$n_{p2,cl}=n_{cl}(1-\tfrac{1}{2})n_{cl}^2(P_{11,cl}e_{p2}+P_{12,cl}(e_{p1}+e_{p3}))) \quad (46)$$

$$n_{p3,co}=n_{co}(1-\tfrac{1}{2}n_{co}^2(P_{11,co}e_{p3}+P_{12,co}(e_{p1}+e_{p2})))$$

$$n_{p3,cl}=n_{cl}(1-\tfrac{1}{2}n_{cl}^2(P_{11,cl}e_{p3}+P_{12,cl}(e_{p1}+e_{p2})))$$

where the $n_{co}$ and $n_{cl}$ terms are the nominal, or zero strain refractive indices in the core and cladding regions 32 and 34. The expression for $\Delta n$ in the x direction is given as:

$$\begin{aligned}
\Delta n_x &= n_{xx,co}-n_{xx,cl} \quad (47)\\
&= n_{p1,co}l_x^2+n_{p2,co}m_x^2+n_{p3,co}n_x^2-\\
&\quad (n_{p1,cl}l_x^2+n_{p2,cl}m_x^2+n_{p3,cl}n_x^2)\\
&= (n_{p1,co}-n_{p1,cl})l_x^2+\\
&\quad (n_{p2,co}-n_{p2,cl})m_x^2+(n_{p3,co}-n_{p3,cl})n_x^2
\end{aligned}$$

Looking at a subset of equation (47) as:

$$\begin{aligned}
(n_{p1,co}-n_{p1,cl}) &= n_{co}\left\{1-\tfrac{1}{2}n_{co}^2dP_{11,co}e_{p1}P_{12,co}(e_{p2}+e_{p3})\right\}- \quad (48)\\
&\quad n_{cl}\left\{1-\tfrac{1}{2}n_{cl}^2[P_{11,cl}e_{p1}+P_{12,cl}(e_{p2}+e_{p3})]\right\}\\
&= n_{co}-\tfrac{1}{2}n_{co}^3[P_{11,co}e_{p1}P_{12,co}(e_{p2}+e_{p3})]-\\
&\quad n_{cl}+\tfrac{1}{2}n_{cl}^3[P_{11,cl}e_{p1}+P_{12,cl}(e_{p2}+e_{p3})]\\
&= (n_{co}-n_{cl})-\\
&\quad \tfrac{1}{2}\{n_{co}^3[P_{11,co}e_{p1}+P_{12,co}(e_{p2}+e_{p3})]-\\
&\quad n_{cl}^3[P_{11,cl}e_{p1}+P_{12,cl}(e_{p2}+e_{p3})]\}
\end{aligned}$$

Parallel derivations to what is shown in equation (48) also hold for $(n_{2,co}-n_{cl})$ and $(n_{3,co}-n_{3,co})$. Applying equation (48) to equation (47) yields:

$$\Delta n_x = ((n_{co} - n_{cl}) - \tfrac{1}{2}\{n_{co}^3[P_{11,co}e_{p1} + P_{12,co}(e_{p2} + e_{p3})] - \qquad (49)$$

$$n_{cl}^3[P_{11,cl}e_{p1} + P_{12,cl}(e_{p2} + e_{p3})]\})\, l_x^2 +$$

$$((n_{co} - n_{cl}) - \tfrac{1}{2}\{n_{co}^3[P_{11,co}e_{p2} + P_{12,co}(e_{p1} + e_{p3})] -$$

$$n_{cl}^3[P_{11,cl}e_{p2} + P_{12,cl}(e_{p1} + e_{p3})]\})\, m_x^2 +$$

$$((n_{co} - n_{cl}) - \tfrac{1}{2}\{n_{co}^3[P_{11,co}e_{p3} + P_{12,co}(e_{p1} + e_{p2})] -$$

$$n_{cl}^3[P_{11,cl}e_{p3} + P_{12,cl}(e_{p1} + e_{p2})]\})\, n_x^2$$

Continuing:

$$\Delta n_x = (n_{co} - n_{cl})(l_x^2 + m_x^2 + n_x^2) - \qquad (50)$$

$$\tfrac{1}{2}(\{n_{co}^3[P_{11,co}e_{p1} + P_{12,co}(e_{p2} + e_{p3})] -$$

$$n_{cl}^3[P_{11,cl}e_{p1} + P_{12,cl}(e_{p2} + e_{p3})]\, l_x^2 +$$

$$n_{co}^3[P_{11,co}e_{p2} + P_{12,co}(e_{p1} + e_{p3})] -$$

$$n_{cl}^3[P_{11,cl}e_{p2} + P_{12,cl}(e_{p1} + e_{p3})]\, m_x^2 +$$

$$n_{co}^3[P_{11,co}e_{p3} + P_{12,co}(e_{p1} + e_{p2})] -$$

$$n_{cl}^3[P_{11,cl}e_{p3} + P_{12,cl}(e_{p1} + e_{p2})]\}\, n_x^2) = \Delta n_0 = \Delta n_{x,e}$$

This is the initial $\Delta n$, $\Delta n_0$ plus change in $\Delta n$ in the x direction due to strain, $\Delta n_{x,e}$. Considering only the $\Delta n_{x,e}$ term in equation (50) gives:

$$\Delta n_{x,e} = \left(-\tfrac{1}{2}\right)\{[n_{co}^3 P_{11,co}e_{p1} + n_{co}^3 P_{12,co}(e_{p2} + e_{p3}) - n_{cl}^3 P_{11,cl}e_{p1} - n_{cl}^3 P_{12,cl}(e_{p2} + e_{p3})]\, l_x^2 + \qquad (51)$$

$$[n_{co}^3 P_{11,co}e_{p2} + n_{co}^3 P_{12,co}(e_{p1} + e_{p3}) - n_{cl}^3 P_{11,cl}e_{p2} - n_{cl}^3 P_{12,cl}(e_{p1} + e_{p3})]\, m_x^2 +$$

$$[n_{co}^3 P_{11,co}e_{p3} + n_{co}^3 P_{12,co}(e_{p1} + e_{p2}) - n_{cl}^3 P_{11,cl}e_{p3} - n_{cl}^3 P_{12,cl}(e_{p1} + e_{p2})]\, n_x^2\}$$

$$= \left(-\tfrac{1}{2}\right)\{[(n_{co}^3 P_{11,co} - n_{cl}^3 P_{11,cl})e_{p1} + (n_{co}^3 P_{12,co} - n_{cl}^3 P_{12,cl})(e_{p2} + e_3)]\, l_x^2 +$$

$$[(n_{co}^3 P_{11,co} - n_{cl}^3 P_{11,cl})e_{p2} + (n_{co}^3 P_{12,cl} - n_{cl}^3)(e_{p1} + e_{p3})]\, m_x^2 +$$

$$[(n_{co}^3 P_{11,co} - n_{cl}^3 P_{11,cl})e_{p3} + (n_{co}^3 P_{12,co} - n_{cl}^3 P_{12,cl})(e_{p1} + e_{p2})]\}\, n_x^2$$

$$= \left(-\tfrac{1}{2}\right)\{(n_{co}^3 P_{11,co} - n_{cl}^3 P_{12,cl})(e_{p1}l_x^2 + e_{p2}m_x^2 + e_{p3}n_x^2) +$$

$$(n_{co}^3 P_{12,co} - n_{cl}^3)[(e_{p2} + 3p3)l_x^2 + (e_{p1} + e_{p3})m_x^2 + (e_{p1} + e_{p2})n_x^2]\}$$

Add and subtract $(e_{p1}l_x^2 + e_{p2}m_x^2 + e_{p3}n_x^2)$ from the term in the [] at the end of equation (51) gives:

$$[(e_{p2} + e_{p3})l_x^2 + (e_{p1} + e_{p3})m_x^2 + (e_{p1} + e_{p2})n_x^2] = \qquad (52)$$

$$= (e_{p2} + e_{p3})l_x^2 + (e_{p1} + e_{p3})m_x^2 + (e_{p1} + e_{p2})n_x^2 +$$

$$(e_{p1}l_x^2 + e_{p2}m_x^2 + e_{p3}n_x^2) - (e_{p1}l_x^2 + e_{p2}m_x^2 + e_{p3}n_x^2) =$$

$$(e_{p1} + e_{p2} + e_{p3})l_x^2 + (e_{p1} + e_{p2} + e_{p3})m_x^2 +$$

$$(e_{p1} + e_{p2} + e_{p3})n_x^2 - (e_{p1}l_x^2 + e_{p2}m_x^2 + e_{p3}n_x^2) =$$

$$(e_{p1} + e_{p2} + e_{p3}) - (e_{p1}l_x^2 + e_{p2}m_x^2 + e_{p3}n_x^2)$$

Incorporating this into equation (52) yields:

$$\Delta n_{x,e} = \left(-\tfrac{1}{2}\right)[(n_{co}^3 P_{11,co} - \qquad (53)$$

$$n_{cl}^3 P_{11,cl})(e_{p1}l_x^2 + e_{p2}m_x^2 + e_{p3}n_x^2) -$$

$$(n_{co}^3 P_{12,co} - n_{cl}^3 P_{12,cl})(e_{p1}l_x^2 + e_{p2}m_x^2 + e_{p3}n_x^2) +$$

$$(n_{co}^3 P_{12,co} n_{cl}^3 P_{12,cl})(e_{p1} + e_{p2} + e_{p3})]$$

$$= \left(-\tfrac{1}{2}\right)\{[n_{co}^3 P_{11,co} - n_{cl}^3 P_{11,cl}) -$$

$$(n_{co}^3 P_{12,co} - n_{cl}^3 P_{12,cl})](e_{p1}l_x^2 + e_{p2}m_x^2 + ep3n_x^2) +$$

$$(n_{co}^3 P_{12,co} - n_{cl}^3 P_{12,cl})(e_{p1} + e_{p2} + e_{p3})\}$$

$$= \left(-\tfrac{1}{2}\right)\{[n_{co}^3(P_{11,co} - P_{12,co}) - n_{cl}^3 -$$

$$P_{12,cl})](e_{p1}l_x^2 + e_{p2}m_x^2 + e_{p3}n_x^2) +$$

$$(n_{co}^3 P_{12,co} - n_{cl}^3 P_{12,cl})(e_{p1} + e_{p2} + e_{p3})\}$$

For the derivation that is parallel to $\Delta n_{x,e}$, the expression for $\Delta n_{y,e}$ can be defined as:

$$\Delta n_{y,e} = \qquad (54)$$

-continued $$= \left(-\tfrac{1}{2}\right)[n_{co}^3(P_{11,co} - P_{12,co}) - n_{cl}^3(P_{11,cl} - P_{12,cl})](e_{p1}l_y^2 +$$

$$e_{p2}m_y^2 + e_{p3}n_y^2\,(n_{co}^3 P_{12,co} - n_{cl}^3 \text{bold}P_{12,cl})(e_{p1} + e_{p2} + e_{p3})$$

Note that:

$$(e_{p1}l_x^2 + e_{p2}m_x^2 + e_{p3}n_x^2) = e_x$$

$$(e_{p1}l_y^2 + e_{p2}m_y^2 + e_{p3}n_y^2) = e_y \qquad (55)$$

$$(e_{p1} + e_{p2} + e_{p3}) = e_h$$

Equations (53) and (54) then reduce to:

$$\Delta n_{x,e} = \left(-\tfrac{1}{2}\right)\{n_{co}^3(P_{11,co} - P_{111}12,co) - n_{cl}^3(P_{11,cl} - P_{12,cl})]e_x + \qquad (56)$$

$$(n_{co}^3 P_{12,co} - n_{cl}^3 P_{12,cl})3e_h\}$$

$$\Delta n_{y,e} = \left(-\frac{1}{2}\right) \{n_{co}^3(P_{11,co} - P_{12,co}) - n_{cl}^3(P_{11,cl} - P_{12,cl})]e_y +$$

$$(n_{co}^3 P_{12,co} - n_{cl}^3 P_{12,co})$$

An interesting consequence of equation (56) is obtained if the Pockels' constants, $P_{11}$ and $P_{12}$ are assumed equal for the core and cladding regions 32 and 34. Equation (56) then becomes:

$$\Delta n_{x,e} = \left(-\frac{1}{2}\right) \{[(n_{co}^3 - n_{cl}^3)(P_{11} - P_{12})]e_x + \quad (57)$$

$$[(n_{co}^3 - n_{cl}^3)P_{12}]3e_h\}$$

$$\Delta n_{y,3} = \left(-\frac{1}{2}\right) \{[(n_{co}^3 - n_{cl}^3)(P_{11} - P_{12})]e_y +$$

$$[(n_{co}^3 - n_{cl}^3)P_{12}]3e_h\}$$

Equation (57) indicates that $\Delta n$ will change due to an applied strain, even if the strain-optic constants of the core and cladding are the same. This could help explain the strain sensitivity of communication fibers and conventional sensing fibers.

Define the following variables:

$$G_1 = [n_{co}^3 P_{11,co} - n_{cl}^3 P_{11,cl}] - G_2$$

$$G_2 = (n_{co}^3 P_{12,co} - n_{cl}^3 P_{12,cl}) \quad (58)$$

Equations (56) and (57) then become:

$$\Delta n_{x,e} = -\frac{1}{2} [(G_1 - g_2)e_x + G_2 3e_h] \quad (59)$$

$$\Delta n_{y,e} = -\frac{1}{2} [(G_1 - G_2)e_y + G_2 3e_h]$$

$G_1$ and $G_2$ are made up of material constants that are treated here as design parameters. The $\Delta n_{x,e}$, and $\Delta n_{y,e}$ can be considered to be measured values that are actually estimated based on the output pulse energies. Equations (59) can be subtracted as follows to obtain:

$$\Delta n_{x,e} - \Delta n_{y,e} = \quad (60)$$

$$-\frac{1}{2} [(G_1 - G_2)e_x - (G_1 - G_2)e_y + (G_2 3e_h - G_2 3e_h)]$$

$$\Delta n_{x,e} - \Delta n_{y,e} = -\frac{1}{2} [(G_1 - G_2)(e_x - e_y)]$$

$$\Delta n_{x,e} - \Delta n_{y,e} = -(G_1 - G_2)\frac{(e_x - e_y)}{2}$$

$$\frac{(e_x - e_y)}{2} = \frac{[\Delta n_{y,3} - \Delta n_{x,e}]}{(G_1 - G_2)}, \quad G_1 \neq G_2$$

Equation (60) should have a reduced sensitivity to temperature changes since the primary temperature effects will cancel when the difference $[\Delta n_{y,e} - \Delta n_{x,e}]$ is calculated. Equation (59) can also be added to obtain:

$$\Delta n_{x,e} + \Delta n_{y,e} = -\frac{1}{2}(G_1 - G_2)(e_x + e_y) + 6G_2 e_h] \quad (61)$$

$$\Delta n_{x,e} + \Delta n_{y,e} = -\left[(G_1 - G_2)\frac{(e_x + e_y)}{2} + 3G_2 e_h\right]$$

$$(G_1 - G_2)\frac{(e_x + e_y)}{2} + 3G_2 e_h = -[\Delta n_{x,e} + \Delta n_{y,e}]$$

Alternately, if the relationship $|(3e_h = (e_x + e_y + e_z))|$ is applied, equation (61) becomes:

$$\Delta n_{x,e} + \Delta n_{y,e} = -\left[(G_1 + G_2)\frac{(e_x + e_y)}{2} + G_2 e_z\right] \quad (62)$$

Equation (59) can then be shown to contain the axial strain $e_z$ in the same manner that equation (61) was converted to equation (62).

There are certain cases that, if they were to occur, would greatly simplify the relationship between strain and $\Delta n_{(x\ or\ y),e}$. These special cases are covered here.

The strain components $e_x$ and $e_y$ can be related to $\Delta n_x$ and $\Delta n_y$, respectively, if the fiber 16 is designed such that:

$$G_2 = (n_{co}^3 P_{12,co} - n_{cl}^3 P_{12,cl}) = 0 \quad (63)$$

$$G_1 \neq 0$$

The necessary condition for this to be non-trivial is given by:

$$n_{co}^3 P_{12,co} = n_{cl}^3 P_{12,cl} \quad (64)$$

$$P_{12,co} = \frac{n_{cl}^3}{n_{co}^3} P_{12,cl}$$

From equation (58), the definition of $G_1$ reduces to:

$$G_1 = n_{co}^3 P_{11,co} - n_{cl}^3 P_{11,cl} \quad (65)$$

The condition in equation (64) eliminates the sensitivity to hydrostatic strain in equation (61) by:

$$\frac{(e_x + e_y)}{2} = \frac{-[\Delta n_{x,e} + \Delta n_{y,e}]}{G_1} \quad (66)$$

This condition also reduces equation (59) to:

$$\Delta n_{x,e} = -\frac{1}{2} G_1 e_x \quad (67)$$

$$\Delta n_{y,e} = -\frac{1}{2} G_1 e_y$$

Which can be rearranged to:

$$e_x = -\frac{2}{G_1} \Delta n_{x,e} \quad (68)$$

$$e_y = -\frac{2}{G_1} \Delta n_{y,e}$$

This case is similar to equation (63), but with $(G_1 - G_2) = 0$ is less likely, but is included for completeness as:

$$(G_1 - G_2) = [n_{co}^3(P_{11,co} - P_{12,co}) - n_{cl}^3(P_{11,cl} - P_{12,cl})] = 0$$

$$G_2 = (n_{co}^3 P_{12,co} - n_{cl}^3 P_{12,cl}) \neq 0 \quad (69)$$

The necessary condition for this to be true occurs when:

$$(G_1 - G_2) = (n_{co}^3 P_{11,co} - n_{cl}^3 P_{11,cl}) - (n_{co}^3 P_{12,co} - n_{cl}^3 P_{12,cl}) = 0$$

$$(n_{co}^3 P_{11,co} - n_{cl}^3 P_{11,cl}) = (n_{co}^3 P_{12,co} - n_{cl}^3 P_{12,cl}) = G_2 \quad (70)$$

$$n_{co}^3(P_{11,co} - P_{12,co}) = n_{cl}^3(P_{11,cl} - P_{12,cl})$$

This condition when applied to equation (61) yields an equation sensitive only to hydrostatic strain as:

$$e_h = -\frac{[\Delta n_{x,e} + \Delta n_{y,e}]}{3G_2} \quad (71)$$

Although equation (71) looks convenient, it seems unlikely that the necessary condition in equation (70) could be easily met. Without condition of equation (70), equation (71) seems to be of little practical value.

A change in applied strain will result in a change in $\Delta n$ along the major and minor axis of the fiber 16. This change in $\Delta n$ will result in a change in the output energy ratio, $\gamma_2$ f the pulses. If the slope of one of these lines is represented by $$\frac{\partial \gamma_2}{\partial (\Delta n)}, \gamma_2$$

can be expressed as a function of $\Delta n$ by using a Taylor series representation:

$$\gamma_2 = \gamma_{2,0} + \frac{\partial \gamma_2}{\partial (\Delta n)} (\Delta n - \Delta n_0) + \ldots \quad (72)$$

$$= \gamma_{2,0} + \frac{\partial \gamma_2}{\partial (\Delta n)} (\Delta n_3) + \ldots$$

where $\gamma_{2,0}$ is the pulse energy ratio at zero strain, $\Delta n_0$ is the $\Delta n$ at zero strain, $$\frac{\partial \gamma_2}{\partial (\Delta n)}$$

is the slope of the constant core-radius lines and $\Delta n_e$ is the change in $\Delta n$ due to the strain. Since $\gamma_2$ can be measured, equation (72) needs to be solved for $\Delta n_e$ as a function of $\gamma_2$. Assuming terms of second order or higher in equation (72) are negligible, and including notation to keep track of x and y directions we get:

$$(\gamma_2 - \gamma_{2,0})_m = \left(\frac{\partial \gamma_2}{\partial (\Delta n)_m}\right) \Delta n_{m,3} \quad (73)$$

$$\Delta n_{m,3} = \frac{(\gamma_2 - \gamma_{2,0})_m}{\left(\frac{\partial \gamma_2}{\partial (\Delta n)}\right)_m} \quad m = x,y \quad (73)$$

Equation (73) is what will enable the determination of the change in $\Delta n$ due to strain. Equation (73) gives the relationship between a measured change in pulse energy and the change in $\Delta n$ that caused it. The strain can then be computed by substituting equation (73) into equation (60), paying particular attention to the x and y directions as:

$$\frac{(e_x - e_y)}{2} = \frac{\left[\frac{(\gamma_2 - \gamma_{2,0})_y}{\left(\frac{\partial \gamma_2}{\partial (\Delta n)}\right)_y} + \frac{(\gamma_2 - \gamma_{2,0})_x}{\left(\frac{\partial \gamma_2}{\partial (\Delta n)}\right)_x}\right]}{(G_1 - G_2)} = \quad (74)$$

$$\frac{\left(\frac{\partial \gamma_2}{\partial (\Delta n)}\right)_x (\gamma_2 - \gamma_{2,0})_y - \left(\frac{\partial \gamma_2}{\partial (\Delta n)}\right)_y (\gamma_2 - \gamma_{2,0})_x}{(G_1 - G_2) \left(\frac{\partial \gamma_2}{\partial (\Delta n)}\right)_y \left(\frac{\partial \gamma_2}{\partial (\Delta n)}\right)_x}, G_1 \neq G_2$$

where $(e_x - e_y)/2$ is a minimum estimator for the magnitude of the shear strain in the x-y plane. This is a minimum estimator principal directions in the transverse plane coincide with $e_x$ and because it will only be equal to the shear strain if the minor principal directions in the transverse plane coincide with $e_x$ and $e_y$. In any other case, the shear strain will be larger than $(e_x - e_y)/2$.

Applying equation (73) to equation (62) yields:

$$\left[(G_1 + G_2)\frac{(e_x + e_y)}{2} + G_2 e_z\right] = \quad (75)$$

$$-\left[\frac{(\gamma_2 - \gamma_{2,0})_x}{\left(\frac{\partial \gamma_2}{\partial (\Delta n)}\right)_x} + \frac{(\gamma_2 - \gamma_{2,0})_y}{\left(\frac{\partial \gamma_2}{\partial (\Delta n)}\right)_y}\right]$$

Note that if $G_1 \gg G_2$ in equation (75), the primary sensitivity is to $(e_x + e_y)$.

Due to there being two equations to work with, the strains cannot be separated further than equations (74) and (75). Further, separation requires more equations.

The inclusion of a second measurement at a different wavelength provides enough equations to separate the three strain components. To help improve the understanding of this, the effect of a second wavelength on the strain versus $\Delta n$ relationships will be considered. The second wavelength will be applied to the pulse energy equations to derive the equations for measurement of all three normal strain components.

In some cases, equations (60) and (62), or equations (68) and (71) if the special cases are satisfied, might provide enough information for the desired sensing system. In cases where the longitudinal and transverse strains need to be separated, and the special conditions required for equations (68) and (71) cannot be satisfied, the sensor can be interrogated at two different wavelengths. In the general case, different wavelengths will result in a different response to applied strain at each wavelength.

Consider equation (62), but at a new wavelength. The variables at the second wavelength will be represented by primed symbols for example $G'_1$, $G'_2$ instead of $G_1$, $G_2$. Equation (62) then becomes:

$$\Delta n'_{x,e} + \Delta n'_{y,e} = -\left[(G'_1 + G'_2)\frac{(e_x + e_y)}{2} + G'_2 e_z\right] \quad (76)$$

Dividing equation (62) by $(G_1 + G_2)$ and equation (76) by $(G'_1 + G'_2)$, then subtracting yields:

$$\frac{\Delta n'_{x,e} + \Delta n'_{y,e}}{(G_1 + G_2)} - \frac{\Delta n'_{x,e} + \Delta n'_{y,e}}{(G'_1 + G'_2)} = \quad (77)$$

$$\left[\frac{G'_2}{(G'_1 + G'_2)} - \frac{G_2}{(G_1 + G_2)}\right] e_z$$

Solving for $e_z$ yields:

$$e_z = \frac{\frac{[\Delta n_{x,e} + \Delta n_{y,e}]}{(G_1 + G_2)} - \frac{[\Delta n'_{x,e} + \Delta n'_{y,e}]}{(G'_1 + G'_2)}}{\left[\frac{G'_2}{(G'_1 + G'_2)} - \frac{G_2}{(G_1 + G_2)}\right]} \quad (78)$$

$$= \frac{(G'_1 + G'_2)[\Delta n_{x,e} + \Delta n_{y,e}] - (G_1 + G_2)[\Delta n'_{x,e} + \Delta n'_{y,e}]}{(G'_2 - G_2)}$$

Now, divide equation (62) by $G_2$ and equation (76) by $G'_2$, then subtracting yields:

$$\frac{[\Delta n_{x,e} + \Delta n_{y,e}]}{G_2} - \frac{[\Delta n'_{x,e} + \Delta n'_{y,e}]}{G'_2} = \quad (79)$$

$$\left[\frac{(G'_1 + G'_2)}{G'_2} - \frac{(G_1 + G_2)}{G_2}\right]\frac{(e_x + e_y)}{2}$$

Solving for $$\frac{(e_x + e_y)}{2}$$

gives:

$$\frac{(e_x + e_y)}{2} = \frac{\frac{[\Delta n_{x,e} + \Delta n_{y,e}]}{G_2} - \frac{[\Delta n'_{x,e} + \Delta n'_{y,e}]}{G'_2}}{\left[\frac{(G'_1 + G'_2)}{G'_2} - \frac{(G_1 + G_2)}{G_2}\right]} \quad (80)$$

$$= \frac{G'_2[\Delta n_{x,e} + \Delta n_{y,e}] - G_2[\Delta n'_{x,e} + \Delta n'_{y,e}]}{[(G'_1 + G'_2) - (G_1 + G_2)]}$$

Recall from equation (60) that:

$$\frac{(e_x - e_y)}{2} = \frac{[\Delta n_{y,e} - \Delta n_{x,e}]}{(G_1 - G_2)}, \; G_1 \neq G_2 \quad (81)$$

Equation (81) will also hold if the parameters at the new wavelength are used as:

$$\frac{(e_x - e_y)}{2} = \frac{[\Delta n'_{y,e} - \Delta n'_{x,e}]}{(G'_1 - G'_2)}, \; G'_1 \neq G'_2 \quad (82)$$

Equations (81) and (82) provide redundancy in the measurement system. This redundancy can potentially be used to estimate certain noise or error factors in the system. The fact that the $\Delta n_{m,e}$ terms are subtracted eliminates many sources of error in the system. In particular, the primary temperature response of the sensor system is likely to be a $\Delta n$ due to temperature. The subtraction of $\Delta n_{m,e}$ terms will subtract out this effect. However, the $(G_1-G_2)$ term might contain some temperature dependance.

Equations (80), (81) or (83) can be used to separate the response to $e_x$ and $e_y$ by simply adding (to get $e_x$) or subtracting (to get $e_y$). In this example, equation (81) is chosen as:

$$e_x = \frac{G'_2[\Delta n_{x,e} + \Delta n_{y,e}] - G_2[\Delta n'_{x,e} + \Delta n'_{y,e}]}{[(G'_1 + G'_2) - (G_1 + G_2)]} + \frac{[\Delta n_{y,e} - \Delta n_{x,e}]}{(G_1 - G_2)} \quad (83)$$

$$e_y = \frac{G'_2[\Delta n_{x,e} + \Delta n_{y,e}] - G_2[\Delta n_{x,e} + \Delta n'_{y,e}]}{[(G'_1 + G'_2) - (G_1 + G_2)]} + \frac{[\Delta n_{y,e} - \Delta n_{x,e}]}{(G_1 - G_2)}$$

and equation (78) gives $e_z$, the strain along the fiber axis.

$$e_z = -\frac{\left\{\frac{\left[\frac{(\gamma_2 - \gamma_{2,0})_x}{\left(\frac{\partial \gamma_2}{\partial(\Delta n)}\right)_x} + \frac{(\gamma_2 - \gamma_{2,0})_y}{\left(\frac{\partial \gamma_2}{\partial(\Delta n)}\right)_y}\right]}{(G_1 + G_2)} - \frac{\left[\frac{(\gamma'_2 - \gamma'_{2,0})_x}{\left(\frac{\partial \gamma'_2}{\partial(\Delta n')}\right)_x} + \frac{(\gamma'_2 - \gamma'_{2,0})_y}{\left(\frac{\partial \gamma'_2}{\partial(\Delta n')}\right)_y}\right]}{(G'_1 + G'_2)}\right\}}{\left[\frac{G_2}{(G_1+G_2)} - \frac{G'_2}{(G'_1+G'_2)}\right]} = \quad (88)$$

$$\left\{(G'_1 + G'_2)\left[\frac{(Y_2 - Y_{2,0})_x}{\left(\frac{\delta Y_2}{\delta(\Delta n)}\right)_x} + \frac{(Y_2 - Y_{2,0})_y}{\left(\frac{\delta Y_2}{\delta(\Delta n)}\right)_y}\right] - (G_1 + G_2)\left[\frac{(Y'_2 - Y'_{2,0})_x}{\left(\frac{\delta Y'_2}{\delta(\Delta n')}\right)_x} + \frac{(Y'_2 - Y'_{2,0})_y}{\left(\frac{\delta Y'_2}{\delta(\Delta n')}\right)_y}\right]\right\} / (G'_2 G_1 - G_2 G'_1)$$

The inclusion of a second wavelength will result in the separation of the three strain components from equation (73) gives:

$$\Delta n_{m,e} = \frac{(\gamma_2 - \gamma_{2,0})_m}{\left(\frac{\partial \gamma_2}{\partial(\Delta n)}\right)_m}, \; m = x, y \quad (84)$$

This is accomplished by rewriting equations (73) using primes on the appropriate variables and constants for the second wavelength as:

$$\Delta n'_{m,e} = \frac{(\gamma'_2 - \gamma'_{2,0})_m}{\left(\frac{\partial \gamma'_2}{\partial(\Delta n')}\right)_m}, \; m = x, y \quad (85)$$

Combining equations (73) and (85) with equations (74) and (75), there are four equations and three unknowns. As given, this amounts to an overdetermined system. For the initial derivation, the three strain components will be found as functions of pulse energies. The remaining equation can be used for estimation of noise in the system or for temperature measurement.

Equation (75) is written with primes on the appropriate constants, as was done for equation (85) as:

$$\left[(G'_1 + G'_2)\frac{(e_x + e_y)}{2} + G'_2 e_z\right] = \quad (86)$$

$$-\left[\frac{(\gamma'_2 - \gamma'_{2,0})_x}{\left(\frac{\partial \gamma'_2}{\partial(\Delta n')}\right)_x} + \frac{(\gamma'_2 - \gamma'_{2,0})_y}{\left(\frac{\partial \gamma'_2}{\partial(\Delta n')}\right)_y}\right]$$

To find an expression for $e_z$, equation (86) is divided by $(G'_1+G'_2)$, and substrated from equation (75), which has been divided by $(G_1+G_2)$ as:

$$\left[\frac{G_2}{(G_1+G_2)} - \frac{G'_2}{(G'_1+G'_2)}\right] e_z = \quad (87)$$

$$\left\{\frac{\left[\frac{(\gamma_2 - \gamma_{2,0})_x}{\left(\frac{\partial \gamma_2}{\partial(\Delta n)}\right)_x} + \frac{(\gamma_2 - \gamma_{2,0})_y}{\left(\frac{\partial \gamma_2}{\partial(\Delta n)}\right)_y}\right]}{(G_1 + G_2)} - \frac{\left[\frac{(\gamma'_2 - \gamma'_{2,0})_x}{\left(\frac{\partial \gamma'_2}{\partial(\Delta n')}\right)_x} + \frac{(\gamma'_2 - \gamma'_{2,0})_y}{\left(\frac{\partial \gamma'_2}{\partial(\Delta n')}\right)_y}\right]}{(G'_1 + G'_2)}\right\}$$

Solving for $e_z$ we get:

An expression for the quantity $(e_x\, e_y)$ can be found by dividing equation (86) by $G'_2$, and subtracting from equation (75), which as been divided by $G_2$ we get:

$$\left[\frac{G_2}{(G_1+G_2)} - \frac{G'_2}{(G'_1+G'_2)}\right]\frac{(e_x+e_y)}{2} = \quad (89)$$

$$-\left\{\frac{\left[\frac{(\gamma_2-\gamma_{2,0})_x}{\left(\frac{\partial\gamma_2}{\partial(\Delta n)}\right)_x} + \frac{(\gamma_2-\gamma_{2,0})_y}{\left(\frac{\partial\gamma_2}{\partial(\Delta n)}\right)_y}\right]}{G_2} - \frac{\left[\frac{(\gamma'_2-\gamma'_{2,0})_x}{\left(\frac{\partial\gamma'_2}{\partial(\Delta n')}\right)_x} + \frac{(\gamma'_2-\gamma'_{2,0})_y}{\left(\frac{\partial\gamma'_2}{\partial(\Delta n')}\right)_y}\right]}{G'_2}\right\}$$

Solving for $$\frac{(e_x+e_y)}{2}$$

we get:

$$\frac{(e_x+e_y)}{2} = \quad (90)$$

$$-\left\{G'_2\left[\frac{(\gamma_2-\gamma_{2,0})_x}{\left(\frac{\partial\gamma_2}{\partial(\Delta n)}\right)_x} + \frac{(\gamma_2-\gamma_{2,0})_y}{\left(\frac{\partial\gamma_2}{\partial(\Delta n)}\right)_y}\right] - G_2\left[\frac{(\gamma'_2-\gamma'_{2,0})_x}{\left(\frac{\partial\gamma'_2}{\partial(\Delta n')}\right)_x} + \frac{(\gamma'_2-\gamma'_{2,0})_y}{\left(\frac{\partial\gamma'_2}{\partial(\Delta n')}\right)_y}\right]\right\}/(G'_2G_1-G_2G'_1)$$

To obtain an expression for $e_x$, equation (74) is added to equation (90) to get:

$$e_x = -\frac{\left(\frac{\delta\gamma_2}{\delta(\Delta n)}\right)_x(\gamma_2-\gamma_{2,0})_y - \left(\frac{\partial\gamma_2}{\partial(\Delta n)}\right)_y(\gamma_2-\gamma_{2,0})_x}{(G_1-G_2)\frac{\partial\gamma_2}{\partial(\Delta n)}\right)_y\left(\frac{\partial\gamma_2}{\partial(\Delta n)}\right)_x} - \quad (91)$$

$$\frac{\left\{G'_2\left[\frac{(\gamma_2-\gamma_{2,0})_x}{\left(\frac{\partial\gamma_2}{\partial(\Delta n)}\right)_x} + \frac{(\gamma_2-\gamma_{2,0})_y}{\left(\frac{\partial\gamma_2}{\partial(\Delta n)}\right)_y}\right] - G_2\left[\frac{(\gamma'_2-\gamma'_{2,0})_x}{\left(\frac{\partial\gamma'_2}{\partial(\Delta n')}\right)_x} + \frac{(\gamma'_2-\gamma'_{2,0})_y}{\left(\frac{\partial\gamma'_2}{\partial(\Delta n')}\right)_y}\right]\right\}}{(G'_2G_1-G_2G'_1)}$$

Similarly, an expression for $e_y$ can be obtained by subtracting equation (74) from equation (91) to get:

$$e_y = -\frac{\left(\frac{\partial\gamma_2}{\partial(\Delta n)}\right)_x(\gamma_2-\gamma_{2,0})_y - \left(\frac{\partial\gamma_2}{\partial(\Delta n)}\right)_y(\gamma_2-\gamma_{2,0})_x}{(G_1-G_2)\frac{\partial\gamma_2}{\partial(\Delta n)}\right)_y\left(\frac{\partial\gamma_2}{\partial(\Delta n)}\right)_x} - \quad (92)$$

$$\frac{\left\{G'_2\left[\frac{(\gamma_2-\gamma_{2,0})_x}{\left(\frac{\partial\gamma_2}{\partial(\Delta n)}\right)_x} + \frac{(\gamma_2-\gamma_{2,0})_y}{\left(\frac{\partial\gamma_2}{\partial(\Delta n)}\right)_y}\right] - G_2\left[\frac{(\gamma'_2-\gamma'_{2,0})_x}{\left(\frac{\partial\gamma'_2}{\partial(\Delta n')}\right)_x} + \frac{(\gamma'_2-\gamma'_{2,0})_y}{\left(\frac{\partial\gamma'_2}{\partial(\Delta n')}\right)_y}\right]\right\}}{(G'_2G_1-G_2G'_1)}$$

In the current context, the strain sensitivity will refer to the change in output pulse energy ratios due to a change in applied strain. This will be represented by $$\frac{d\gamma_2}{de},$$

where e is the total strain. This definition was chosen because the pulse energy ratio $\gamma_2$ is what will be measured, and, the accuracy in measurement of the pulse energies will likely be the limiting factor in the resolution of strain. The strain sensitivity will vary somewhat with the direction of the strain relative to the orientation of the fiber since it depends on the $$\frac{\partial\gamma_2}{\partial(\Delta n)},$$

which varies as a function of the radius of the fiber 16. The strain sensitivity in any particular direction will be calculated by letting the strain sensitivities in the other directions go to zero (see equations (99) and (100)).

The sensor will be sensitive to the components of strain that are normal to the principal directions of the fiber 16, i.e., the axial direction and the directions corresponding to the major and minor axis of the ellipse. There will be little sensitivity to the shear components.

The sensitivity will, in general be different for the major and minor axis of the elliptical core fiber sensor. The sensitivity for each transverse direction can be determined by starting with equation (73):

$$(\gamma_2-\gamma_{2,0}) = \frac{\partial\gamma_2}{\partial(\Delta n)}(\Delta n_e) \quad (93)$$

The $\gamma_2, \gamma_{2,0}$ and $$\frac{\partial \gamma_2}{\partial(\Delta n)}$$

terms will be different for the x or y axis of the fiber 16, and will be represented by:

$$\gamma_2 \Rightarrow (\gamma_2)_m \quad (94)$$

$$\gamma_{2,0} \Rightarrow (\gamma_{2,0})_m$$

$$\frac{\partial \gamma_2}{\partial(\Delta N)} \Rightarrow \left.\frac{\partial \gamma_2}{\partial(\Delta n)}\right)_m, m=x,y$$

The $(\Delta n_e)$ term is equivalent to:

$$\Delta n_e = \Delta n(e) \equiv \Delta n(e) \quad (95)$$

What is needed is the derivative of $\Delta n_e$ with respect to the strain so the following chain rule can be applied:

$$\left(\frac{\partial \gamma_2}{\partial(\Delta n)}\right)_m \times \left(\frac{\partial}{\partial e}(\Delta n)\right)_m = \left(\frac{d\gamma_2}{de}\right)_m, m=x,y \quad (96)$$

where the definite has been used for $$\frac{d\gamma_2}{de}$$

because change is assumed to be due only to strain. So, for small strains and using equation (59) we get:

$$\therefore d(\Delta n_e)_m = -\frac{1}{2}\,[(G_1-G_2)de_m + G_2 3\, de_h], m=x,y \quad (97)$$

Now, the relation $3e_h=(e_x+e_y+e_z)$ is employed to equation (97). Considering first the: pulses oriented in the "x" direction:

$$d(\Delta n_e)_x = -\frac{1}{2}\,[(G_1-G_2)de_x + G_2(de_x+de_y+de_z)] = -$$

$$\frac{1}{2}\,[G_1 de_x + G_2(de_y+de_z)] \quad (98)$$

The resulting strain sensitivities are then:

$$\left(\frac{d\gamma_2}{de_x}\right)_x = \left(\frac{\partial \gamma_2}{\partial(\Delta n)}\right)_x \left(-\frac{1}{2}G_1\right) \quad (99)$$

$$\left(\frac{d\gamma_2}{de_y}\right)_x = \left(\frac{d\gamma_2}{de_z}\right)_x = \left(\frac{\partial \gamma_2}{\partial(\Delta n)}\right)_x \left(-\frac{1}{2}G_2\right)$$

The parallel derivation yields sensitivities for pulses in the y direction and gives:

$$\left(\frac{d\gamma_2}{de_y}\right)_y = \left(\frac{\partial \gamma_2}{\partial(\Delta n)}\right)_y \left(-\frac{1}{2}G_1\right) \quad (100)$$

$$\left(\frac{d\gamma_2}{de_x}\right)_y = \left(\frac{d\gamma_2}{de_z}\right)_y = \left(\frac{\partial \gamma_2}{\partial(\Delta n)}\right)_y \left(-\frac{1}{2}G_2\right)$$

Equation (75) can be used to get a strain resolution. A strain resolution is the least increment of strain that can be measured. This is found by considering the lowest change in pulse energy that can reliably be measured, which is represented by:

$$[(\gamma_2-(\gamma_{2,0}))_m]_{min}, m=x,y \quad (101)$$

The starting point is equation (75):

$$(G_1+G_2)\frac{(e_x+e_y)}{2} + \quad (102)$$

$$G_2 e_z = -\left[\frac{[(\gamma_2-\gamma_{2,0})_x]}{\left(\frac{\partial \gamma_2}{\partial(\Delta n)}\right)_x} + \frac{[(\gamma_2-\gamma_{2,0})_y]}{\left(\frac{\partial \gamma_2}{\partial(\Delta n)}\right)_y}\right]$$

The minimum strain that can be measured in each strain direction is found from equation (102), but with the strains in the opposite directions set to zero:

$$(e_{z,min}) = \left|-\frac{1}{G_2}\left\{\frac{[(\gamma_2-\gamma_{2,0})_x]_{min}}{\left(\frac{\partial \gamma_2}{\partial(\Delta n)}\right)_x} + \frac{[\gamma_2-\gamma_{2,0})_y]_{min}}{\left(\frac{\partial \gamma_2}{\partial(\Delta n)}\right)_y}\right\}\right| \quad (103)$$

$$(e_{x,min}) = (e_{y,min}) =$$

$$\left|-\frac{2}{(G_1+G_2)}\left\{\frac{[\gamma_2-\gamma_{2,0})_x]_{min}}{\left(\frac{\partial \gamma_2}{\partial(\Delta n)}\right)_x} + \frac{[\gamma_2-\gamma_{2,0})_y]_{min}}{\left(\frac{\partial \gamma_2}{\partial(\Delta n)}\right)_y}\right\}\right| =$$

$$\left|\frac{2G_2}{G_1+G_2}(e_{z,min})\right|$$

The magnitude of each is taken because only the magnitude of the resolvable strain is significant.

Figure 4:
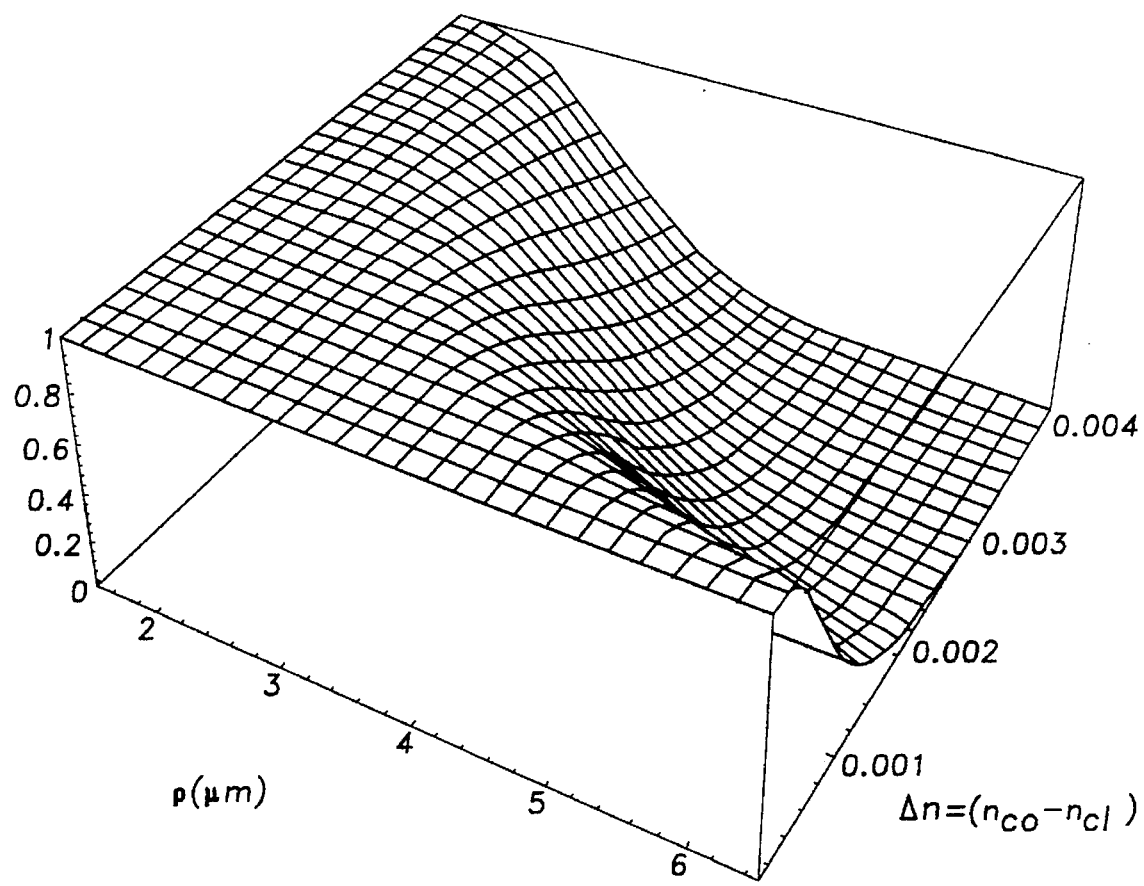
FIG. 4 is a graph showing power loss of interacting pulses at different strains.

From the discussion above, FIG. 4 shows a graphic depiction of the amount of energy on the vertical axis remaining in the fiber 16 after interaction of the pulses 20 and 24 as a function of different core region radii ρ and different changes in the index of refraction Δn between the core region 32 and the cladding region 34. The different energy levels are normalized to a range between zero and one. Applying a strain to the fiber 16 will have the effect of moving along one of the constant radius lines.

The developments discussed above have assumed that temperature will have no affect on the strain measurement. However, in real applications, temperature is likely to vary and will likely affect the strain measurement. The temperature will also have an affect on the output pulse energies. Therefore, it may be desirable to consider temperature effects on the strain measurements.

From the discussion above, it can be ascertained that the optical fiber 16 of the present invention should have the certain characteristics to best realize the invention. These characteristics include a single mode elliptical core design, a different strain-optic response between the core and cladding regions, a material with strongly negative Kerr nonlinearity in the core region and a linear material in the cladding region, low absorption, and definition of the major and minor axis of the fiber. Of course, an optical fiber sensor of the invention need not have all of these characteristics to at least perform the invention in part.

Currently, the choice material for fabricating optical fibers is primarily between silica or a polymer material. To date, all optical fiber strain sensors have been made from silica fibers instead of polymers due to the very low loss, high temperature survivability, resistance to physical damage, ease of fabrication of single mode designs, and the availability of the silica fibers. The most difficult characteristic to satisfy of the above characteristics is providing a negative Kerr material. One known class of materials that exhibits this characteristic are referred to as squarylium dyes as disclosed in Kuzyk, M. G. et al. "Guest-Host Polymer Fibers for Nonlinear Optics," Applied Physics Letters, Vol. 59, No. 8, Aug.

19, 1991, pp. 902–904. Squarylium dyes are organic dyes that have a particular electronic configuration on the dye molecule that responds to an applied optical or electric field in a desirable manner. The use of the squarylium dyes places additional constraints on the design. Particularly, squarylium dyes are organic and will break down in temperatures of about 250°–300° F. This temperature constraint eliminates the possibility of using silica fibers doped with squarylium dyes since their processing temperatures are much higher than this. Therefore, for the embodiments described herein, polymer materials appear to be required. In one example, the polymer is a polymethylmethacrylate (PMMA).

Squarylium dyes are used as a minor constituent in the material of the fiber 16. The mixture of the dye in the polymer material forming the fiber 16 changes the configuration of the resulting structure considerably. This change in structure results in a change in the strain-optic behavior of the material. The inclusion of the dye also raises the refractive index of the polymer. Using squarylium dyes in the core material of a plastic fiber and using a pure polymer in the cladding material will result in a fiber with the increased refractive index in the core region 32, a negative Kerr material in the core region 32, and different strain-optic responses between the core region 32 and the cladding region 34 that is desirable. The material can then be fabricated into an elliptical core design to meet that condition.

The low absorption requirement defines the wavelengths of light that can be used in the system 10. This is due to the combined effects of the absorption characteristics of the polymer materials and the resonant absorption behavior of the family of dyes used. Squarylium dye molecules have a strong resonance at an optical wavelength of 658 nm. At wavelengths that are longer than this resonant wavelength, the electronic Kerr response will be negative. At shorter wavelengths the electronic Kerr response will be positive. If the wavelength is to close to the resonance, the absorption will be too high. The useful range of wavelength of light used should be between 1 µm and 1.4 µm.

The absorption versus wavelength of light curves for polymer materials show a relatively high absorption above 800 nm, except for a narrow region around 1.3 µm. This is due to the resonant and harmonic frequency associated with the carbon-hydrogen bonds in the polymer material. The only apparent choice left for the fiber sensor designer is to use standard polymers with squarylium dyes at a wavelength of about 1.3 µm, or modify the absorption characteristics of the polymer. Methods that can be used to modify the absorption characteristics of the polymer material are all based on changing the resonant frequencies of the carbon-hydrogen bonds. This is accomplished by increasing the weight of the hydrogen of the molecules in the polymer. The weight of the hydrogen can be increased by using specially prepared polymers such that the hydrogen atoms are all replaced with a deuterium isotope of hydrogen. This isotope has the same chemical properties as standard hydrogen, but is twice the weight of standard hydrogen. The increased weight has a profound effect on the absorption curve of the polymers, shifting the absorption out to longer wavelengths where the absorption will do no damage to the measurements.

Figure 5:
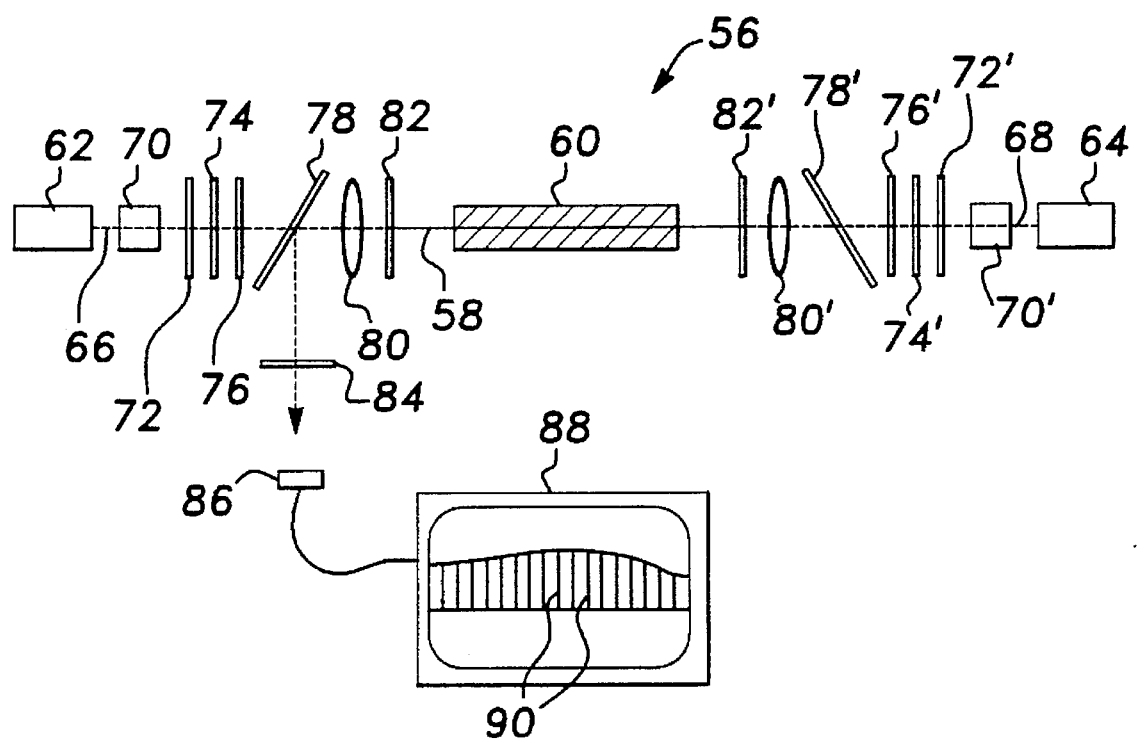
FIG. 5 is a diagrammatic view of an optical fiber strain sensor according to an embodiment of the present invention.

FIG. 5 shows a detailed diagrammatic view of a fiber optic strain sensor 56 according to an embodiment of the present invention. The strain sensor 56 includes an optical sensing fiber 58 that is embedded in a structure 60 in which strains on the structure 60 are to be measured by the above described process. The sensor 56 further includes a first optical source 62 at one end of the fiber 58 and a second optical source 64 at an opposite end of the fiber 58. The optical sources 62 and 64 can be appropriate lasers or photodiodes adequate for the purposes described herein. The optical source requirements are dictated by the requirements of the sensor 56 and the materials of the sensing fiber 58. The optical sources 62 and 64 will be capable of producing a steady stream of optical pulses at 50–80 picoseconds full wave at half maximum (FWHM). The optical source 62 emits a first stream of optical pulses 66 and the second optical source 64 emits a second stream of optical pulses 68. In one embodiment, the wavelength of the pulses 66 and 68 should be about 1.3 µm or about 1.0–1.1 µm depending on the materials chosen for the fiber 58. The pulse length of the pulses 66 and 68 will directly determine the length of the interaction region between the pulses 66 and 68 within the structure 60. In an alternate embodiment, one of the optical sources 62 or 64 emits a continuous optical beam, and the other source emits optical pulses such that the interaction of the pulse with the beam provides the interaction region. The optical sources 62 and 64 are set up with pulse repetition rates that are slightly different so as to cause the pulse interaction region between the pulses 66 and 68 to move along the fiber 58. In one example, mode lock Md-YAG and Md-YLF lasers are effective for these requirements. It is noted that the optical sources 62 and 64 can be replaced with a single optical source where the pulse beam from the single optical source is separated into two pulse streams by appropriate optics as would be well understood to one skilled in the art.

An optical isolator 70 prevents light from entering the optical source 62. A one-quarter wave plate 72 is rotatable so as to change the polarization direction of the pulses 66 so that they are not linearly polarized. A polarizer 74 establishes a polarization, i.e., direction of the electric field of the pulses 66 to be oriented along either the major or minor axis of the optical fiber 58 as discussed above. Polarized pulses 66 from the polarizer 74 then impinge a variable absorber 76 that attenuates the pulses 66 so as to establish a known power level of the optical intensity of the pulses 66. The pulses 66 then impinge a partially reflecting mirror 78 such that a portion of the intensity of the pulses 66 impinge a lens 80. The lens 80 focuses the pulses 66 onto an end of the fiber 58. The fiber 58 is held in a fiber holder 82 so as to align the fiber 58 appropriately with the pulses 66. Like components to those just described are situated at the other end of the sensor 56 in the same configuration and are labeled accordingly with a prime.

The pulses 68 from the optical source 64 that have interacted with the pulses 66 within the structure 60 impinge the mirror 78 and a portion of the intensity of the pulses 68 are reflected through a polarizer 84 onto a photodetector 86. The polarization ensures that only light of the polarization direction being measured impinge the photodetector 86. The photodetector 86 provides an electronic signal indicative of the intensity of the pulses 68 impinging the photodetector 86 to be illustrated on an oscilloscope 88. A photodiode and associated polarizer can be provided to detect the pulses 66 being reflected from the partially reflecting mirror 78' after the pulses 66 and 68 interact. The combination of this photodetector along with the photodetector 86 can provide a redundancy in the strain determination for averaging purposes. All of the components of the sensor 56 would be part of the monitoring unit 14 of FIG. 1 except for the fiber 58 and the structure 60.

The pulses 68 are displayed on the oscilloscope 88 as representative pulses 90. Each pulse 90 on the oscilloscope 88 represents a separate interaction of the pulses 66 with the pulses 68 somewhere along the fiber 58 within the structure 60. The pulse frequency of the pulses 66 and 68 are set so that the interaction region moves along the fiber 58. The height of the different pulses 90 gives an indication of the. intensity of the pulses 68. A change in the height of the pulses 90 from a calibration height would indicate the level of loss of intensity at that interaction region, and thus an indication of strain.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A distributed fiber optic sensor comprising:
    optical means for generating a first optical beam and a second optical beam;
    an optical fiber including a first end responsive to the first optical beam and a second end responsive to the second optical beam, said optical fiber further including a core region and a cladding region, said cladding region surrounding said core region, wherein the core region is made of a first material and the cladding region is made of a second material such that a strain on the fiber causes a change in the index of refraction of the core region that is significantly different than a change in the index of refraction of the cladding region, said first material being a fast Kerr nonlinear material, said fast Kerr nonlinear material having a sufficiently short time response and a sufficiently large Kerr nonlinearity so that the first optical beam and the second optical beam interact in an interaction region within the optical fiber to cause a measurable portion of the first optical beam to be emitted from the core region as a result of the interaction between the first and second optical beams; and
    a detector, said detector being responsive to the first optical beam after it has interacted with the second optical beam, said detector provided an indication of the intensity of the first optical beam.

2. The sensor according to claim 1 wherein the core region is a negative Kerr material.

3. The sensor according to claim 1 wherein the first material is a polymer doped with a squarylium dye and the second material is an undoped polymer.

4. The sensor according to claim 3 wherein the polymer of the first and second material is polymethylmethacrylate.

5. The sensor according to claim 1 further comprising means for polarizing the first optical beam and the second optical beam so that the first and second optical beams have substantially the same polarization within the optical fiber.

6. The sensor according to claim 1 wherein the core region and the cladding region have an elliptical cross-section that defines a minor elliptical axis and a major elliptical axis, said elliptical cross-section creating a polarization maintaining fiber such that the first optical beam and the second optical beam are polarized along either the minor or major elliptical axis.

7. The sensor according to claim 1 wherein the optical means generates a first optical beam of pulses and a second optical beam of pulses between about 50 to about 80 picoseconds full wave at half maximum, said optical means varying the pulse rate of the first beam of pulses so that the interaction region changes locations within the fiber.

8. The sensor according to claim 1 wherein the optical means includes a first and second optical source that are optical sources selected from the group consisting of a laser and a photodiode.

9. The sensor according to claim 1 wherein the first optical beam is a beam of optical pulses and the second optical beam is a continuous optical beam.

10. A distributed fiber optic strain sensor for measuring the strain on a structure, said sensor comprising:
    a polarization maintaining optical fiber including a first end responsive to a first optical beam and a second end responsive to a second optical beam, said optical fiber further including a core region and a cladding region, wherein the core region is made of a first material and the cladding region is made of a second material such that a strain on the fiber causes a change in the index of refraction of the core region that is significantly different than a change in the index of refraction of the cladding region, said first material being a fast Kerr nonlinear material, said fast Kerr nonlinear material having a sufficiently short time response and a sufficiently large Kerr nonlinearity so that the first optical beam and the second optical beam interact in an interaction region within the optical fiber to cause a measurable portion of the first optical beam to be emitted from the core region as a result of the interaction between the first and second optical beams, said portion of the first optical beam emitted from the core region being indicative of a strain on the structure.

11. The sensor according to claim 10 wherein the core region is a negative Kerr material.

12. The sensor according to claim 10 wherein the core region is made of a polymer doped with a squarylium dye and the cladding region is made of an undoped polymer.

13. The sensor according to claim 10 wherein the core region and the cladding region have an elliptical cross-section that defines a minor elliptical axis and a major elliptical axis, said sensor further comprising means for polarizing the first optical beam and the second optical beam such that the first optical beam and the second optical beam are polarized along one of either the minor or major elliptical axis.

14. The sensor according to claim 10 further comprising a first optical source that generates the first optical beam and a second optical source that generates the second optical beam, wherein the first optical beam is a beam of pulses and the second optical beam is a beam of pulses, and wherein the pulse rate of the first optical source varies from the pulse rate of the first beam of pulses so that the interaction region changes location within the fiber.

15. A distributed fiber optic strain sensor for measuring the strain on a structure, said sensor comprising:
    a first optical source, said first optical source generating a first beam of optical pulses;
    a second optical source, said second optical source generating a second beam of optical pulses;
    a polarization maintaining optical fiber having a first end and a second end, said optical fiber including a core region and a cladding region, said core region being made of a first material including a fast nonlinear negative Kerr material and the cladding region being made of a second material such that a strain on the fiber causes a change in the index of refraction of the core region that is different than a change in the index of refraction of the cladding region, said core region and said cladding region have an elliptical cross-section that defines a minor elliptical axis and a major elliptical axis, said core region being responsive to the first beam of pulses at the first end of the fiber and the second beam of pulses at the second end of the fiber such that the first and second beam of pulses are polarized along one of either the minor or major elliptical axis, said fast nonlinear negative Kerr material having a sufficiently short time response and a sufficiently large Kerr non-linearity so that the first beam of optical pulses and the second beam of optical pulses interact in an interaction region within the optical fiber to cause a measurable portion of the first beam of optical pulse to be emitted from the core region as a result of the interaction between the first and second beam of pulses; and a detector, said detector being responsive to the first beam of pulses after it has interacted with the second beam of pulses, said detector providing an indication of the portion of the first beam of pulses that it was emitted from the core region so as to give a representation of the strain on the structure.

16. The sensor according to claim 15 wherein the first material is a polymer doped with a squarylium dye and the second material is an undoped polymer.

17. The sensor according to claim 15 wherein the first optical source and the second optical source are first and second lasers wherein the first and second lasers generate pulse streams of about fifty to about eighty picoseconds full wave at half maximum at a wavelength of around 1 µm.

* * * * *

UNITED STATES PATENT AND TRADEMARK OFFICE
CERTIFICATE OF CORRECTION

PATENT NO. : 5,627,637
DATED : May 6, 1997
INVENTOR(S) : Kelvin L. Kapteyn It is certified that error appears in the above-identified patent and that said Letters Patent is hereby corrected as shown below:

Column 8, line 43 "ill halve" should be --will have--.
Column 17, line 27, after "plus" add --the--.
Column 21, line 10 "f" should be --of--.
Column 10, Equation 10, following "=" insert --$a^2$--.
Column 12, Equation 22, after "|Ē ť|$^2$", first occurrence, insert --=--.

Column 12, Equation 24, after "|Ē ť|$^2$", first occurrence, insert --=--.
Column 13, Equation 34, replace second occurrence "R" with --F--.
Column 15, Equation 38, delete "tm".
Column 15, Equation 40, delete "tm".

Signed and Sealed this

First Day of June, 1999

Q. TODD DICKINSON

*Attest:*

*Attesting Officer*   *Acting Commissioner of Patents and Trademarks*